United States Patent
Hardy et al.

(10) Patent No.: US 12,093,350 B2
(45) Date of Patent: Sep. 17, 2024

(54) DIGITAL MEDIA DISTRIBUTION SYSTEM AND USES THEREOF

(71) Applicant: Videomentum, Inc., Washington, DC (US)

(72) Inventors: Brian Hardy, Durham, NC (US); John Paul Lawrence, Washington, DC (US)

(73) Assignee: Brian Hardy, Durham, NC (US)

( * ) Notice: Subject to any disclaimer, the term of this patent is extended or adjusted under 35 U.S.C. 154(b) by 0 days.

(21) Appl. No.: 17/831,708

(22) Filed: Jun. 3, 2022

(65) Prior Publication Data

US 2023/0394445 A1 Dec. 7, 2023

Related U.S. Application Data

(60) Provisional application No. 63/348,403, filed on Jun. 2, 2022.

(51) Int. Cl.
*G06F 21/10* (2013.01)
*G06Q 20/06* (2012.01)
*G06Q 30/0601* (2023.01)

(52) U.S. Cl.
CPC .......... *G06Q 20/065* (2013.01); *G06F 21/10* (2013.01); *G06Q 30/0601* (2013.01)

(58) Field of Classification Search
CPC ............. G06Q 20/065; G06Q 30/0601; G06Q 20/123; G06F 21/10; H04L 2209/60
See application file for complete search history.

(56) References Cited

U.S. PATENT DOCUMENTS

| 10,257,253 B1* | 4/2019 | Freedman | G06F 16/9577 |
| 2002/0099663 A1* | 7/2002 | Yoshino | H04L 63/0807 705/65 |
| 2006/0230065 A1* | 10/2006 | Plastina | G06Q 30/0601 |
| 2007/0208632 A1* | 9/2007 | Downes | G07F 7/02 705/26.1 |
| 2010/0332981 A1* | 12/2010 | Lipton | G11B 27/031 715/769 |

(Continued)

FOREIGN PATENT DOCUMENTS

CN 103119604 A * 5/2013 ......... G06Q 30/0207

OTHER PUBLICATIONS

"Introducing Frame.io Camera to Cloud", Business Wire, Feb. 11, 2021 (Year: 2021).*

*Primary Examiner* — Duan Zhang
(74) *Attorney, Agent, or Firm* — John P. Lawrence

(57) ABSTRACT

One variation of a method comprises: a) One variation of a method comprises: detecting a first selection, by a digital media consumer, of a first digital media frame generated for a first digital media asset and presented within a graphical user interface (GUI) of a first web gallery in a locked state; b) deducting a first amount of media credits equal to a first media credit value established for the first digital media asset from a media credit account associated with the digital media consumer; and c) in response to detecting the first selection of the first digital media frame and successfully deducting the first amount of media credits equal to the first media credit value from the media credit account associated with the digital media consumer, unlocking the first digital media frame to provide the digital media consumer with access to the first digital media asset.

20 Claims, 11 Drawing Sheets

(56) References Cited

U.S. PATENT DOCUMENTS

| | | | | |
|---|---|---|---|---|
| 2012/0109754 A1* | 5/2012 | Mei | ............... | G06Q 30/0251 |
| | | | | 709/219 |
| 2013/0060661 A1* | 3/2013 | Block | ............... | G06Q 30/06 |
| | | | | 726/28 |
| 2013/0332395 A1* | 12/2013 | Kim | ............... | G06Q 30/0206 |
| | | | | 705/400 |
| 2014/0245196 A1* | 8/2014 | Zheng | ............... | G06F 8/38 |
| | | | | 715/762 |

* cited by examiner

DIGITAL MEDIA DISTRIBUTION SYSTEM AND USES THEREOF

TECHNICAL FIELD

This invention relates generally to the field of digital media distribution. More specifically, the invention discloses a new and useful system for distributing digital media assets in a decentralized manner.

BACKGROUND

While the internet and the digital age have made it easier to produce and access art (i.e., in digital forms), the same cannot be said for commercially distributing art. With physical or real world forms of art, an artist or producer of the art is able to freely charge and collect compensation for the art from patrons wherever the artist or producer has been given a license to do so (e.g., implicitly or explicitly), without further tools or permissions. For example, wherever it is legal, an artist is free to provide their art to the public and charge and collect compensation from their patrons with little more than a hat on the ground. With digital art, however, because digital tools (e.g., websites, media players, file sharing systems, digital payment gateways, etc.) must be built and utilized in order to charge and collect compensation from patrons, artists are much more limited in their ability to commercially distribute their art. Conversely, artists are much more dependent on, and beholden to, third-party services for commercially distributing their art.

Generally, if an artist cannot develop and maintain their own digital warehouse and digital storefront (e.g., a server system to store and retrieve their art, and a website with a digital payment gateway, respectively), which can be a technically difficult and resource intensive endeavor, the artist must provide their art to a third-party distribution platform (hereinafter, "distribution platform") that can sell their art to consumers on the artist's behalf. For example, a musician can provide a song to a distribution platform such as Spotify, a writer can provide a novel to a distribution platform such as Amazon's Kindle Direct Publishing, or a video artist can provide a video to a distribution platform such as YouTube. However, in exchange for providing an artist with a digital warehouse and digital storefront, a distribution platform generally can and will impose various limitations and stipulations on the artist, including, but not limited to, the amount of money that the artist can charge or receive for their art, the type of content that their art can include, and which consumers that the their art is marketed to. For example, on Spotify, it has been reported that a musician receives less than half of a cent (<$0.005) per stream of the musician's song. Or for example, on YouTube, it has been reported that a video earns less than half of a cent (<$0.005) per view. On both Spotify and YouTube, songs and videos that are recommended to users of the distribution platform are decided by the respective distribution platform's curators or algorithms. On some distribution platforms, like Spotify and YouTube, on which artists are compensated per stream or per view, an artist who provides their art to the distribution platform retains ownership rights over their art. On some distribution platforms, like Netflix, an artist who provides their art to the distribution platform must sell the ownership rights over their art to the distribution platform in exchange for a one-time, lump sum payment from the distribution platform. Thus, ultimately, if an artist is unable to develop and maintain their own digital warehouse and digital storefront, the artist must generally sacrifice some combination of ownership, agency, and profit in order to commercially distribute their art. This paradigm can have a profound effect not only on the artists themselves, whose livelihoods often suffer, but on the quality of the art that they produce. Similarly, because the means of commercializing digital art are difficult to develop or otherwise acquire, the legitimate distribution platform options for commercializing digital art are few. And, because the distribution platform options are so few, the current market for digital art fails to adequately support the every niche of digital art, further harming the artists.

SUMMARY

In various embodiments, disclosed herein are methods and systems for providing and facilitating a distribution infrastructure for digital media assets (hereinafter, "digital media distribution infrastructure"). In some embodiments, the digital media distribution infrastructure (DMDI) allows a digital media producer (e.g., a digital media artist) to commercialize a digital media asset through a digital territory (e.g., a web domain, a software application, or any other uniquely addressable digital resource). In some embodiments, the DMDI generates a digital media frame (e.g., an application programming interface (API)) for a digital media asset submitted to the DMDI by the digital media producer that can be executed within a graphical user interface (GUI) of any digital territory. In some embodiments, a digital media consumer can access the digital media asset through the digital media frame. In some embodiments, a digital media consumer can access the digital media asset through the digital media frame only if the digital media consumer is associated with a media credit account provided by the DMDI that contains an amount of media credits equal to or greater than a media credit value established for the digital media asset. In some embodiments, the media credit value established for the digital media asset is determined by the digital media producer. In some embodiments, a portion of the media credits deducted from a media credit account associated with a digital media consumer by the DMDI to provide the digital media consumer with access to a digital media asset through a digital media frame is added to a media credit account associated with the digital media producer that submitted the digital media asset to the DMDI. In some embodiments, the DMDI can generate a plurality of digital media frames for a respective plurality of digital media assets submitted to the DMDI by a respective plurality of digital media producers, and a digital media consumer can access the plurality of digital media assets through the respective plurality of digital media frames executed within the GUIs of a respective plurality of digital territories. In some embodiments, a digital media curator can integrate one or more digital media frames generated for digital media assets that the digital media curator did not submit to the DMDI into a digital territory associated with the digital media curator. In some embodiments, when a digital media consumer access a digital media asset through a digital media frame integrated by a digital media curator into a digital territory associated with the digital media curator, a portion of the media credits deducted from a media account associated with the digital media consumer by the DMDI to provide the digital media consumer with access to the digital media asset through the digital media frame is added to a media credit account associated with the digital media curator.

In one aspect, a method for facilitating a distribution infrastructure for digital media assets comprises: a) detecting a first selection, by a digital media consumer, of a first digital media frame generated for a first digital media asset and presented within a graphical user interface (GUI) of a first web gallery in a locked state; b) deducting a first amount of credits equal to a first media credit value established for the first digital media asset from a media credit account associated with the digital media consumer; c) in response to detecting the first selection of the first digital media frame and successfully deducting the first amount of media credits equal to the first media credit value established for the first digital media asset from the media credit account associated with the digital media consumer, unlocking the first digital media frame to provide the digital media consumer with access to the first digital media asset; d) detecting a second selection, by the digital media consumer, of a second digital media frame generated for a second digital media asset and presented within a GUI of a second web gallery in a locked state; e) deducting a second amount of media credits equal to a second media credit value established for the second digital media asset from the media credit account associated with the digital media consumer; and f) in response to detecting the second selection of the second digital media frame and successfully deducting the second amount of media credits equal to the second media credit value established for the second digital media asset from the media credit account associated with the digital media consumer, unlocking the second digital media frame to provide the digital media consumer with access to the second digital media asset. In some embodiments, the first digital media asset is associated with a first digital media producer and the second digital media asset is associated with a second digital media producer and the method further comprises adding a first portion of the first amount of media credits to a second media credit account associated with the first digital media producer and a second portion of the second amount of media credits to a third media credit account associated with the second digital media producer. In some embodiments, the first and second media credit values established for the first and second digital media assets are determined by the first and second digital media producers, respectively. In some embodiments, the first and second web galleries are websites, web applications, or mobile applications. In some embodiments, the first and second web galleries are accessed by the digital media consumer through separate digital territories. In some embodiments, both the first and second digital media assets are text files or image files. In some embodiments, both the first and second digital media assets are audio files or video files. In some embodiments, the first and second media credit values are determined based at least in part on the respective lengths of the audio or video files. In some embodiments, unlocking the first and second digital media frames comprises transmitting the audio files or video files to one or more electronic devices on which the first and second web galleries are accessed for download. In some embodiments, unlocking the first and second digital media frames comprises streaming the audio or video files through the respective GUIs of the first and second web galleries. In some embodiments, the first and second digital media assets are different media types. In some embodiments, the method further comprises providing a digital media portal to the digital media consumer, wherein the digital media portal displays a list of digital media assets accessed by the digital media consumer and wherein the list of digital media assets accessed by the digital media consumer comprises the first and second digital media assets. In some embodiments, the digital media portal displays digital media frames suggested for the digital media consumer. In some embodiments, the digital media portal displays the number of media credits in the media credit account associated with the digital media consumer. In some embodiments, the first and second digital media assets are accessible to the digital media consumer through the digital media portal. In some embodiments, the method further comprises a) providing, to the digital media consumer, a media credit portal; and b) receiving, through the media credit portal, a request to add media credits to the media credit account associated with the digital media consumer. In some embodiments, the digital media consumer is directed to the media credit portal from the first or second web gallery. In some embodiments, the media credit portal is provided to the digital media consumer through a digital territory separate from the first and second web galleries. In some embodiments, the media credit portal is provided to the digital media consumer through a digital media portal.

In another aspect, a distribution system for digital media assets comprises at least one processor, a memory, and instructions executable by the at least one processor to cause the at least one processor to: a) detect a first selection, by a digital media consumer, of a first digital media frame generated for a first digital media asset and presented within a graphical user interface (GUI) of a first web gallery in a locked state; b) deduct a first amount of media credits equal to a first media credit value established for the first digital media asset from a media credit account associated with the digital media consumer; c) in response to detecting the first selection of the first digital media frame and successfully deducting the first amount of media credits equal to the first media credit value from the media credit account associated with the digital media consumer, unlock the first digital media frame to provide the digital media consumer with access to the first digital media asset; d) detect a second selection, by the digital media consumer, of a second digital media frame generated for a second digital media asset and presented within a GUI of a second web gallery in a locked state; e) deduct a second amount of media credits equal to a second media credit value established for the second digital media asset from the media credit account associated with the digital media consumer; and f) in response to detecting the second selection of the second digital media frame and successfully deducting the second amount of media credits equal to the second media credit value from the media credit account associated with the digital media consumer, unlock the second digital media frame to provide the digital media consumer with access to the second digital media asset.

In another aspect, a method for facilitating a distribution infrastructure for digital media assets comprises: a) providing, to a digital media curator, a digital media frame generated for a digital media asset; b) detecting a selection, by a digital media consumer, of the digital media frame presented in a locked state within a graphical user interface (GUI) of a web gallery associated with the digital media curator; c) deducting an amount of media credits equal to a media credit value established for the digital media asset from a first media credit account associated with the digital media consumer; d) in response to detecting the selection of the digital media frame and successfully deducting the amount of media credits equal to the media credit value established for the digital media asset from the first media credit account associated with the digital media consumer, unlocking the digital media frame to provide the digital media consumer with access to the digital media asset; and e) adding a first portion of the amount of media credits deducted from the first media credit account associated with the digital media consumer to a second media credit account associated with the digital media curator. In some embodiments, the digital media asset is associated with a digital media producer and the digital media curator is not the digital media producer. In some embodiments, the digital media asset is associated with a digital media producer and the method further comprises adding a second portion of the amount of media credits deducted from the media credit account associated with the digital media consumer to a third media credit account associated with the digital media producer. In some embodiments, the second portion is greater than the first portion. In some embodiments, the second portion is less than the first portion. In some embodiments, the digital media asset is associated with a digital media producer and the media credit value established for the digital media asset is determined by the digital media producer. In some embodiments, the web gallery is a website, a web application, or a mobile application. In some embodiments, the digital media asset is a text file or an image file. In some embodiments, the digital media asset is an audio file or a video file. In some embodiments, the media credit value established for the digital media asset is based at least in part on the length of the audio or video file. In some embodiments, unlocking the digital media frame to provide the digital media consumer with access to the digital media asset comprises transmitting the audio or video file to an electronic device on which the web gallery is accessed for download. In some embodiments, unlocking the digital media frame to provide the digital media consumer with access to the digital media asset comprises streaming the audio or video file through the GUI of the web gallery. In some embodiments, the method further comprises: a) providing, to a second digital media curator, the digital media frame generated for the digital media asset; b) detecting a second selection, by a second digital media consumer, of the digital media frame presented in a locked state within a graphical user interface (GUI) of a second web gallery associated with the second digital media curator; c) deducting the amount of media credits equal to the media credit value established for the digital media asset from a third media credit account associated with the second digital media consumer; d) in response to detecting the second selection of the digital media frame and successfully deducting the amount of media credits equal to the media credit value established for the digital media asset from the third media credit account associated with the second digital media consumer, unlocking the digital media frame to provide the second digital media consumer with access to the digital media asset; and e) adding a second portion of the amount of media credits deducted from the third media credit account associated with the second digital media consumer to a fourth media credit account associated with the second digital media curator. In some embodiments, the method further comprises: a) providing, to a second digital media curator, a second digital media frame generated for a second digital media asset; b) detecting a second selection, by the digital media consumer, of the second digital media frame presented in a locked state within a graphical user interface (GUI) of a second web gallery associated with the second digital media curator; c) deducting a second amount of media credits equal to a second media credit value established for the second digital media asset from the first media credit account associated with the digital media consumer; d) in response to detecting the second selection of the second digital media frame and successfully deducting the second amount of credits equal to the second media credit value established for the second digital media asset from the first media credit account associated with the digital media consumer, unlocking the second digital media frame to provide the digital media consumer with access to the second digital media asset; and e) adding a second portion of the second amount of media credits deducted from the first media credit account associated with the digital media consumer to a third media credit account associated with the second digital media curator. In some embodiments, the method further comprises providing a digital media portal to the digital media consumer, wherein the digital media portal displays a list of digital media assets accessed by the digital media consumer and wherein the list of digital media assets accessed by the digital media consumer comprises the first and second digital media assets. In some embodiments, the digital media portal displays digital media frames suggested for the digital media consumer. In some embodiments, the digital media portal displays the number of media credits in the media credit account associated with the digital media consumer. In some embodiments, the first and second digital media assets are accessible to the digital media consumer through the digital media portal. In some embodiments, the digital media frame provided to the digital media curator is autonomously selected for the digital media curator by a curation algorithm.

In another aspect, a distribution system for digital media assets comprises at least one processor, a memory, and instructions executable by the at least one processor to cause the at least one processor to: a) provide, to a digital media curator, a digital media frame generated for a digital media asset; b) detect a selection, by a digital media consumer, of the digital media frame presented in a locked state within a graphical user interface (GUI) of a web gallery associated with the digital media curator; c) deduct an amount of media credits equal to a media credit value established for the digital media asset from a first media credit account associated with the digital media consumer; d) in response to detecting the selection of the digital media frame and successfully deducting the amount of media credits equal to the media credit value established for the digital media asset from the first media credit account associated with the digital media consumer, unlock the digital media frame to provide the digital media consumer with access to the digital media asset; and e) add a portion of the amount of media credits deducted from the first media credit account associated with the digital media consumer to a second media credit account associated with the digital media curator.

For example, in one application of the present invention, a dance team choreographs, performs, and records a new dance. The dance team would like to sell the recording of the new dance on the dance team's website. To do so, the dance team digitally submits the recording of the new dance to the digital media distribution infrastructure (DMDI), which establishes a media credit value for the recording of the new dance, generates a digital media frame (e.g., an API) for the recording of the new dance, and provides the digital media frame to the dance team. In this example, the media credit value established for the recording is five media credits. The dance team then integrates the digital media frame into the dance team's website. Then, a fan of the dance team, who has a media credit account provided by the DMDI that contains ten media credits, navigates to the dance team's website (e.g., through a standard web browser) and selects the digital media frame generated for the recording of the dance team's new dance, which is initially presented within the GUI of the dance team's website in a locked state. Through the digital media frame, the DMDI identifies the media credit account associated with the fan of the dance team and deducts the media credit value established for the recording of the dance team's new dance (i.e., five media credits) from the media credit account associated with the fan of the dance team. In response to successfully deducting the media credit value established for the recording of the dance team's new dance from the media credit account associated with the fan of the dance team, the DMDI unlocks the digital media frame and provides the fan of the dance team with access to the recording of the dance team's new dance (e.g., by allowing the fan of the dance team to download the recording of the dance team's new dance or stream the recording the dance team's new dance through the GUI of the dance team's website). The DMDI then adds a portion (e.g., three credits) of the five media credits deducted from the media credit account associated with the fan of the dance team to a media credit account associated with dance the team.

Later, in another example, a musician composes and records a new song and would like to sell the recording of the new song on the musician's website. To do so, the musician digitally submits the recording of the new song to the DMDI, which establishes a media credit value for the recording of the new song, generates a digital media frame (e.g., an API) for the recording of the new song, and provides the digital media frame to the musician. In this example, the media credit value established for the recording of the new song is five media credits. The musician then integrates the digital media frame into the musician's website. Then, the fan of the dance team, who is also a fan of the musician, navigates to the musician's website (e.g., through a standard web browser) and selects the digital media frame generated for the recording of the new song, which is initially presented within the GUI of the musician's website in a locked state. Through the digital media frame, the DMDI again identifies the media credit account associated with the fan (which now contains five media credits) and deducts the media credit value established for the recording of the new song (i.e., five media credits) from the media credit account associated with the fan. In response to successfully deducting the media credit value established for the recording of the new song from the media credit account associated with the fan, the DMDI unlocks the digital media frame and provides the fan with access to the recording of the new song (e.g., by allowing the fan to download the recording of the new song or stream the recording of the new song through the GUI of the musician's website). The DMDI then adds a portion (e.g., three credits) of the five media credits deducted from the media credit account associated with the fan to a media credit account associated with the musician. In this example, the fan, whose media credit account now contains zero credits, will not be able unlock any other digital media frame that has been generated by the DMDI for a digital media asset for which a media credit value greater than zero has been established, until the fan acquires more media credits from the DMDI.

Later, in another example, the fan of the dance team and the musician from the previous two examples accesses the two digital media frames generated by the DMDI for the recording of the dance team's new dance and the recording of the musician's new song and integrates the two digital media frames into the fan's own website. By integrating a digital media frame into the fan's website, the fan becomes a digital media curator. The fan then shares their website with a friend, who selects the digital media frame generated for the recording of the dance team's new dance, which is initially presented within the GUI of the fan's website in a locked state. Through the digital media frame generated for the recording of the dance team's new dance, the DMDI identifies a media credit account associated with the fan's friend (which, in this example, contains twelve media credits) and deducts the media credit value established for the dance team's new song (i.e., five media credits) from the media credit account associated with the fan's friend. In response to deducting the media credit value established for the recording of the dance team's new dance from the media credit account associated with the fan's friend, the DMDI unlocks the digital media frame generated for the recording of the dance team's new dance and provides the fan's friend with access to the recording of the dance team's new dance. The DMDI then adds a first portion (e.g., three credits) of the five media credits deducted from the media credit account associated with the fan's friend to the media credit account associated with the dance team, and, because the digital media frame generated for the recording of the dance team's new dance was accessed through the fan's website, the DMDI also adds a second portion (e.g., one credit) of the five media credits deducted from the media credit account associated with the fan's friend to the media credit account associated with the fan.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE DRAWINGS

Numerous embodiments of the invention will now be described in detail with reference to the accompanying figures. The following description of the embodiments of the invention is not intended to limit the invention to these embodiments but rather to enable a person of ordinary skill in the art to make and use this invention. The variations, configurations, implementations, and applications described herein are optional and not exclusive to the variations, configurations, implementations, and applications they describe. The invention described herein can include any and all permutations of these variations, configurations, implementations, and applications.

In the following description, numerous specific details are set forth in order to provide a thorough understanding of the invention. It will be apparent, however, to one of ordinary skill in the art that the invention can be practiced without these specific details.

Reference in this specification to "one embodiment," "an embodiment," or "some embodiments" means that a particular feature, structure, or characteristic described in connection with the embodiment is included in at least one embodiment of the invention. The appearances of the phrase "in one embodiment" or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

Digital Media Distribution Infrastructure

Figure 1:
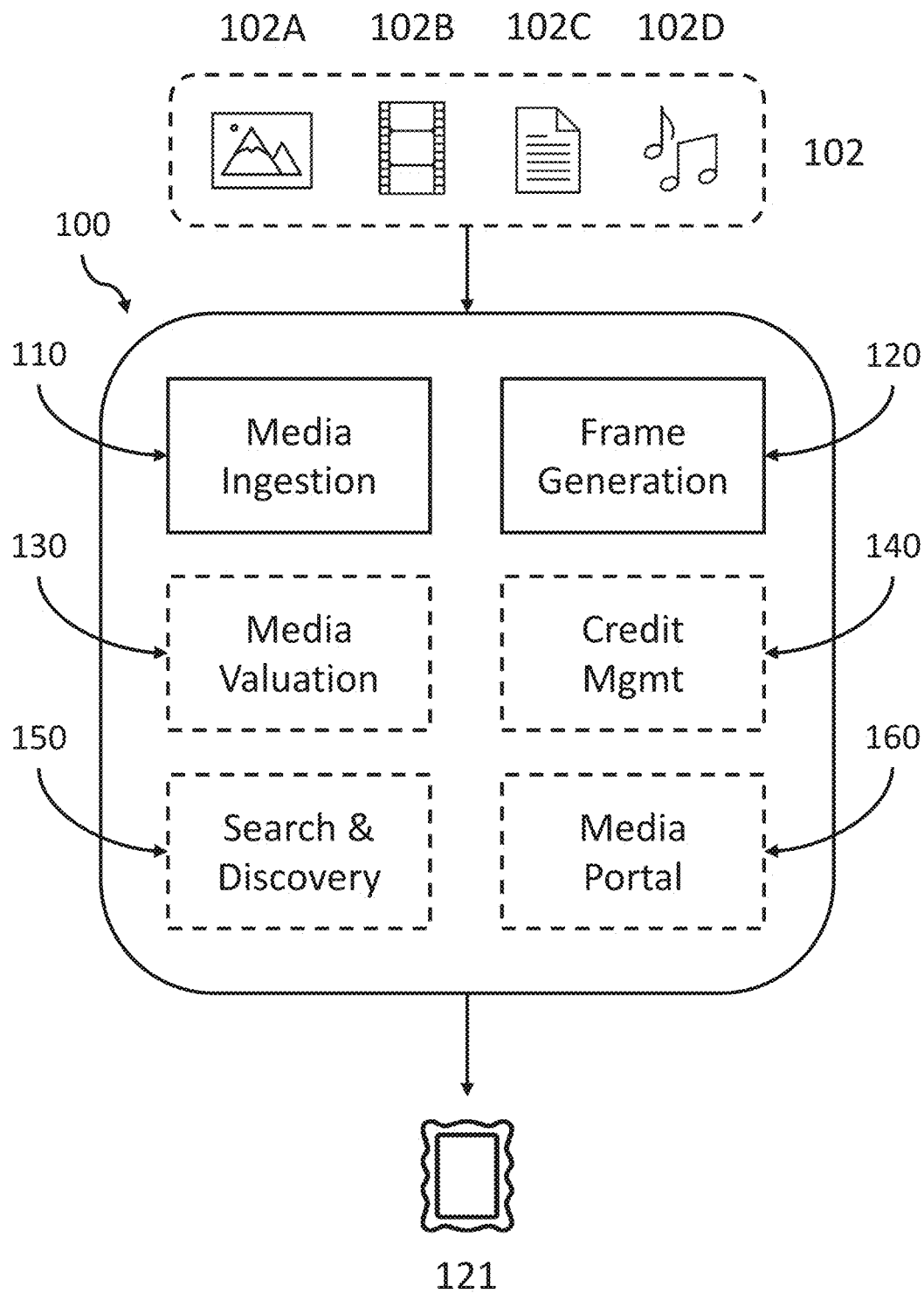
FIG. 1 depicts a diagram of a digital media distribution infrastructure.

As mentioned above, in various embodiments, disclosed herein are methods and systems for providing and facilitating a distribution infrastructure for digital media assets (also referred to as a "digital media distribution infrastructure" or a "DMDI"). FIG. 1 depicts a diagram of an exemplary embodiment of a digital media distribution infrastructure (DMDI). As depicted in FIG. 1, in some embodiments, a DMDI 100 includes one or more modules (e.g., software modules), such as digital media ingestion module 110 and digital media frame generation module 120. In some embodiments, the DMDI 100 additionally includes a digital media valuation module 130, a media credit management module 140, a search and discovery module 150, or a digital media portal module 160. In general, the modules of the DMDI 100 function cooperatively to receive a digital media asset 102 (e.g., image file 102A, video file 102B, text file 102C, or audio file 102D), generate a digital media frame 121 for the digital media asset 102, and manage the accessing of the digital media asset 102 through the digital media frame 121. The various functions of the DMDI 100 and the modules included therein are described in further detail below.

Figure 2:
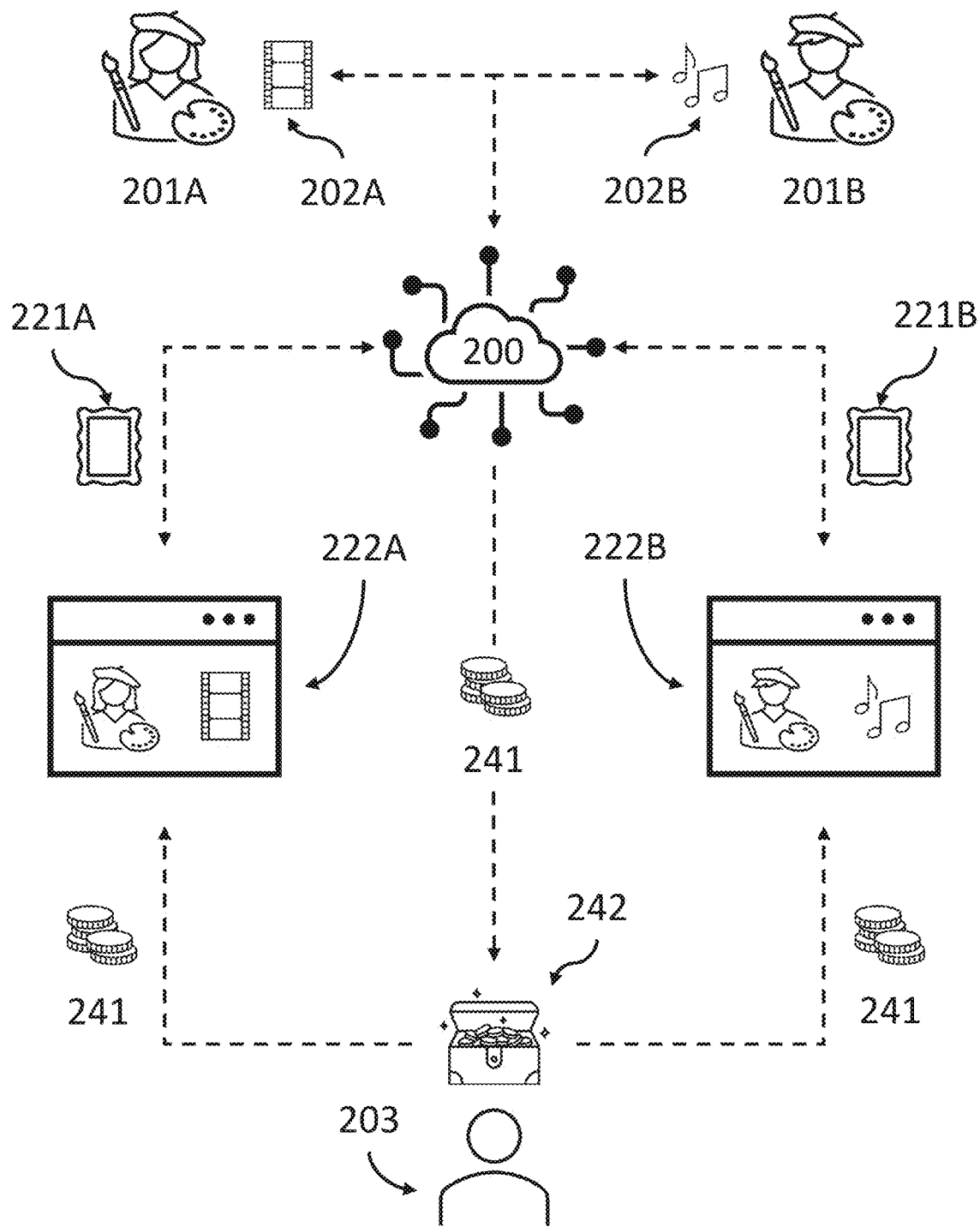
FIG. 2 depicts a process for distributing digital media assets in a decentralized manner using a digital media distribution infrastructure.

FIG. 2 depicts an exemplary process for distributing digital media assets in a decentralized manner using a digital media distribution infrastructure. As described above, in general, if an artist cannot develop and maintain their own digital warehouse (e.g., a server system to store and retrieve their art) and a digital storefront (e.g., a website with a digital payment gateway), the artist must provide their art to a distribution platform that can commercialize the artist's art on the artist's behalf. And, generally, such distribution platforms can and will impose debilitating limitations and stipulations on the artist and their art. In various embodiments, as depicted in FIG. 2, a digital media distribution infrastructure (DMDI) 200 can receive a digital media asset 202 from digital media producer 201 (e.g., an artist) and generate a digital media frame 221 for the digital media asset 202, which can be integrated into any digital territory. As described below, in various embodiments, a digital media consumer 203 can acquire media credits 241 from the DMDI 200 and use the media credits 241 to access the digital media asset 202 through the digital media frame 221. As described below, in various embodiments, the DMDI 200 can then add a portion (e.g., some or all) of the media credits 241 used by the digital media consumer 203 to access the digital media asset 202 through the digital media frame 221 to a media credit account associated with the digital media producer 201. Thus, effectively, the digital media frame 221 serves as both an access point to the digital media asset 202 and a point of sale for media credit transactions, thereby providing the digital media producer 201 with their own digital storefront. The DMDI 200 stores the digital media asset 202 submitted to the DMDI 200 by the digital media producer 201 within one or more digital media databases included in, or otherwise communicatively coupled to, the DMDI 200, from which the digital media asset 202 can be retrieved when accessed through the digital media frame 221, thereby providing the digital media producer 201 with a digital warehouse. By providing digital media producers 201 with a digital warehouse and their own digital storefronts, the DMDI 200 facilitates an infrastructure for distributing digital media assets in a decentralized manner.

Digital Media Frames

In some embodiments, a process for distributing digital media assets in a decentralized manner begins with a digital media producer 201 (e.g., an artist), such as videographer 201A, submitting a digital media asset 202 (e.g., video file 202A) to a digital media distribution infrastructure (DMDI) 200 (e.g., by employing the digital media ingestion module 110, as depicted in FIG. 1). In some embodiments, after receiving the digital media asset 202, the DMDI 200 stores the digital media asset 202 in one or more digital media databases. In some embodiments, after receiving the digital media asset 202, the DMDI 200 generates a digital media frame 221 (e.g., digital media frame 221A) for the digital media asset 202 (e.g., by employing the digital media frame generation module 120, as depicted in FIG. 1) and establishes a media credit value for the digital media asset 202 (e.g., by employing the digital media valuation module 130, as depicted in FIG. 1), as described below. In some embodiments, the digital media frame 221 is a compilation of programming commands (e.g., a software script) that, when executed, prompts a software system (e.g., a website, a web application, or a mobile application) into which the digital media frame 221 has been integrated to display a widget (e.g., an interactive graphical element) within a graphical user interface (GUI) of the software system through which the digital media asset 202 can be accessed. In some embodiments, the digital media frame 221 is an application programming interface (API). A software system into which a digital media frame 221 has been integrated is referred to hereinafter as a web gallery (e.g., web gallery 222A).

In some embodiments, the DMDI 200 provides a GUI (e.g., a website) through which a digital media producer 201 can submit a digital media asset 202 to the DMDI 200. In some embodiments, when a digital media producer 201 submits a digital media asset 202 to the DMDI 200, the digital media producer 201 submits information regarding the digital media asset 202 as well (e.g., through a GUI provided by the DMDI 200). For example, in some embodiments, the digital media producer 201 can submit information regarding the digital media asset 202 such as a title of the digital media asset 202, a name of the creator or the digital media producer of the digital media asset 202, a written description of the digital media asset 202, or tags describing the digital media asset 202. In some embodiments, some or all of the information regarding the digital media asset 202 submitted by the digital media producer 201 is displayed by a digital media frame 221 (e.g., the widget of the digital media frame 221) generated by the DMDI 200 for the digital media asset 202 when the digital media frame 221 (e.g., the widget of the digital media frame 221) is displayed within the GUI of a web gallery 222 into which the digital media frame 221 has been integrated. In some embodiments, when the digital media producer 201 submits a digital media asset 202 to the DMDI 200, the digital media producer 201 establishes a media credit value for the digital media asset 202 (e.g., by employing the digital media valuation module 130, as depicted in FIG. 1). In some embodiments, when the digital media producer 201 submits a digital media asset 202 to the DMDI 200, the DMDI 200 establishes a media credit value for the digital media asset 202 (e.g., by employing the digital media valuation module 130, as depicted in FIG. 1). For example, in some embodiments, the DMDI 200 establishes a media credit value for a digital media asset 202 based at least in part on a length of the digital media asset 202 (e.g., the length of an audio or video file) or a file size of the digital media asset 202. However, the DMDI 200 may establish a media credit value for a digital media asset 202 in any other way. In some embodiments, the media credit value established for the digital media asset 202 is displayed by a digital media frame 221 (e.g., the widget of the digital media frame 221) generated by the DMDI 200 for the digital media asset 202 when the digital media frame 221 (e.g., the widget of the digital media frame 221) is displayed within the GUI of a web gallery 222 into which the digital media frame 221 has been integrated, as described below.

In some embodiments, the form and function of the widget of a digital media frame 221 that is displayed within the GUI of a web gallery 222 depends on the type of digital media asset 202 for which the digital media frame 221 was generated. For example, in some embodiments, if the digital media asset 202 for which a digital media frame 221 was generated is an audio file, the widget of the digital media frame 221 that is displayed within the GUI of a web gallery 222 into which the digital media frame 221 is integrated will be in the form of an audio player interface, and, when the digital media frame 221 is unlocked (as described below), the widget will perform functions of an audio player application. In some embodiments, if the digital media asset 202 for which a digital media frame 221 was generated is a video file, the widget of the digital media frame 221 that is displayed within the GUI of a web gallery 222 into which the digital media frame 221 is integrated will be in the form of a video player interface, and, when the digital media frame 221 is unlocked (as described below), the widget will perform the functions of a video player application. In some embodiments, if the digital media asset 202 for which a digital media frame 221 was generated is a text file, the widget of the digital media frame 221 that is displayed within the GUI of a web gallery 222 into which the digital media frame 221 is integrated will be in the form of a text viewer interface, and, when the digital media frame 221 is unlocked (as described below), the widget will perform the functions of a text viewer application. In some embodiments, if the digital media asset 202 for which a digital media frame 221 was generated is an image file, the widget of the digital media frame 221 that is displayed within the GUI of a web gallery 222 into which the digital media frame 221 is integrated will be in the form of an image viewer interface, and, when the digital media frame 221 is unlocked (as described below), the widget will perform the functions of an image viewer application. However, the widget of a digital media frame 221 may take on any form or perform any function.

In some embodiments, when a digital media frame 221 is integrated into a web gallery 222, the digital media frame 221 (e.g., the widget of the digital media frame 221) is initially (e.g., when a digital media consumer 203 first accesses the web gallery 222) presented within the GUI of the web gallery 222 in a locked state. When the digital media frame 221 (e.g., the widget of the digital media frame 221) is displayed within the GUI of a web gallery 222 in a locked state, the digital media frame 221 (e.g., the widget of the digital media frame 221) will not allow a digital media consumer 203 to access the digital media asset 202 for which the digital media frame 221 was generated. For example, if the digital media asset 202 for which a digital media frame 221 was generated is a video file (e.g., video file 202A), and the digital media frame 221 is displayed within the GUI of a web gallery 222 in a locked state, the digital media frame 221 (e.g., the widget of the digital media frame 221) will not allow a digital media consumer 203 to download the video file or stream the video file within the GUI of the web gallery 222. However, in some embodiments, when a digital media frame 221 is displayed within the GUI of a web gallery 222 into which the digital media frame 221 has been integrated in a locked state, the digital media frame 221 (e.g., the widget of the digital media frame 221) can display a preview of the digital media asset 202 for which the digital media frame 221 was generated. For example, if the digital media asset 202 for which a digital media frame 221 was generated is a video file (e.g., video file 202A), when the digital media frame 221 is displayed within the GUI of a web gallery 222 in a locked state, the digital media frame 221 may display only the first few seconds of the video file if selected by or hovered over by a digital media consumer 203. Or, for example, in some embodiments, if the digital media asset 202 is a text file, the locked digital media frame 221 may display only the first few lines of the text file as a preview of the text file. Or, for example, if the digital media asset 202 is an image file, the locked digital media frame 221 may display the image file with a watermark superimposed over the image file. In some embodiments, a digital media frame 221 is displayed within the GUI of a web gallery 222 in a locked state until the DMDI 200 successfully deducts an amount of media credits 241 equal to the media credit value (as described below) established for the digital media asset 202 for which the digital media frame 221 was generated from a media credit account 242 (as described below) associated with a digital media consumer 203 who has selected the digital media frame 221 from within the GUI of the web gallery 222 (e.g., by employing media credit management module 140, as depicted in FIG. 1). In some embodiments, the digital media frame 221 will then be unlocked by the DMDI 200 and displayed within the GUI of the web gallery 222 in an unlocked state (as described below). In some embodiments, a digital media frame 221 is initially displayed within the GUI of a web gallery 222 into which the digital media frame 221 has been integrated in an unlocked state (as described below) only if the media credit value (as described below) established for the digital media asset 202 for which the digital media frame 221 was generated is zero credits.

In some embodiments, when a digital media frame 221 has been unlocked, or when the digital media frame 221 (e.g., the widget of the digital media frame 221) is displayed within the GUI of a web gallery 222 in an unlocked state (e.g., the media credit value established for the digital media asset 202 for which the digital media frame 221 was generated is zero credits, or the DMDI 200 has successfully deducted an amount of media credits 241 equal to the media credit value established for the digital media asset 202 for which the digital media frame 221 was generated from a media credit account 242 associated with a digital media consumer 203 who has selected the digital media frame 221 from within the GUI of the web gallery 222, as described below), the DMDI 200 will provide the digital media asset 202 for which the digital media frame 221 was generated to the web gallery 222 for access by a digital media consumer 203. For example, in some embodiments, when a digital media frame 221 has been unlocked, or when the digital media frame 221 (e.g., the widget of the digital media frame 221) is displayed within the GUI of a web gallery 222 in an unlocked state, a digital media consumer 203 may download (e.g., onto the electronic device that the digital media consumer 203 is accessing the web gallery 222 on) the digital media asset 202 for which the digital media frame 221 was generated. Or, for example, in some embodiments, when a digital media frame 221 has been unlocked, or when the digital media frame 221 (e.g., the widget of the digital media frame 221) is displayed within the GUI of a web gallery 222 in an unlocked state, a digital media consumer 203 may stream the digital media asset 202 for which the digital media frame 221 was generated through the GUI of the web gallery 222 (e.g., through the widget of the digital media frame 221).

In some embodiments, a digital media frame 221 does not have a widget, and can be paired with a pre-existing interactive graphical element built into the web gallery 222. For example, in some embodiments, a digital media producer 201 can integrate a digital media frame 221 into a media player of their choice that has been previously built into a web gallery 222. In such an embodiment, the media player may not change in appearance when the digital media frame 221 is locked or unlocked. However, regardless of the appearance of the media player into which the digital media frame 221 has been integrated, the DMDI 200 will not provide the digital media asset 202 for which the digital media frame 221 was generated to the web gallery 222 until the digital media frame 221 has been unlocked. In some embodiments, if a digital media consumer 203 selects, within the GUI of a web gallery 222, a pre-existing interactive graphical element (e.g., a media player) into which a digital media frame 221 has been integrated, the DMDI 200 will attempt to deduct the media credit value established for the digital media asset 202 for which the digital media frame 221 was generated from a media credit account 242 associated with the digital media consumer 203. If the DMDI 200 successfully deducts the media credit value established for the digital media asset 202 for which the digital media frame 221 was generated from the media credit account 242 associated with the digital media consumer 203, the DMDI 200 will provide the digital media asset 202 to the web gallery 222 for the digital media consumer 203 to access through the pre-existing interactive graphical element. In some embodiments, if the DMDI 200 is unable to deduct the media credit value established for the digital media asset 202 for which the digital media frame 221 was generated from the media credit account 242 associated with the digital media consumer 203, the pre-existing interactive graphical element will function as a link that directs the digital media consumer 203 to a media credit portal (as described below).

Web Galleries

Figure 3A:
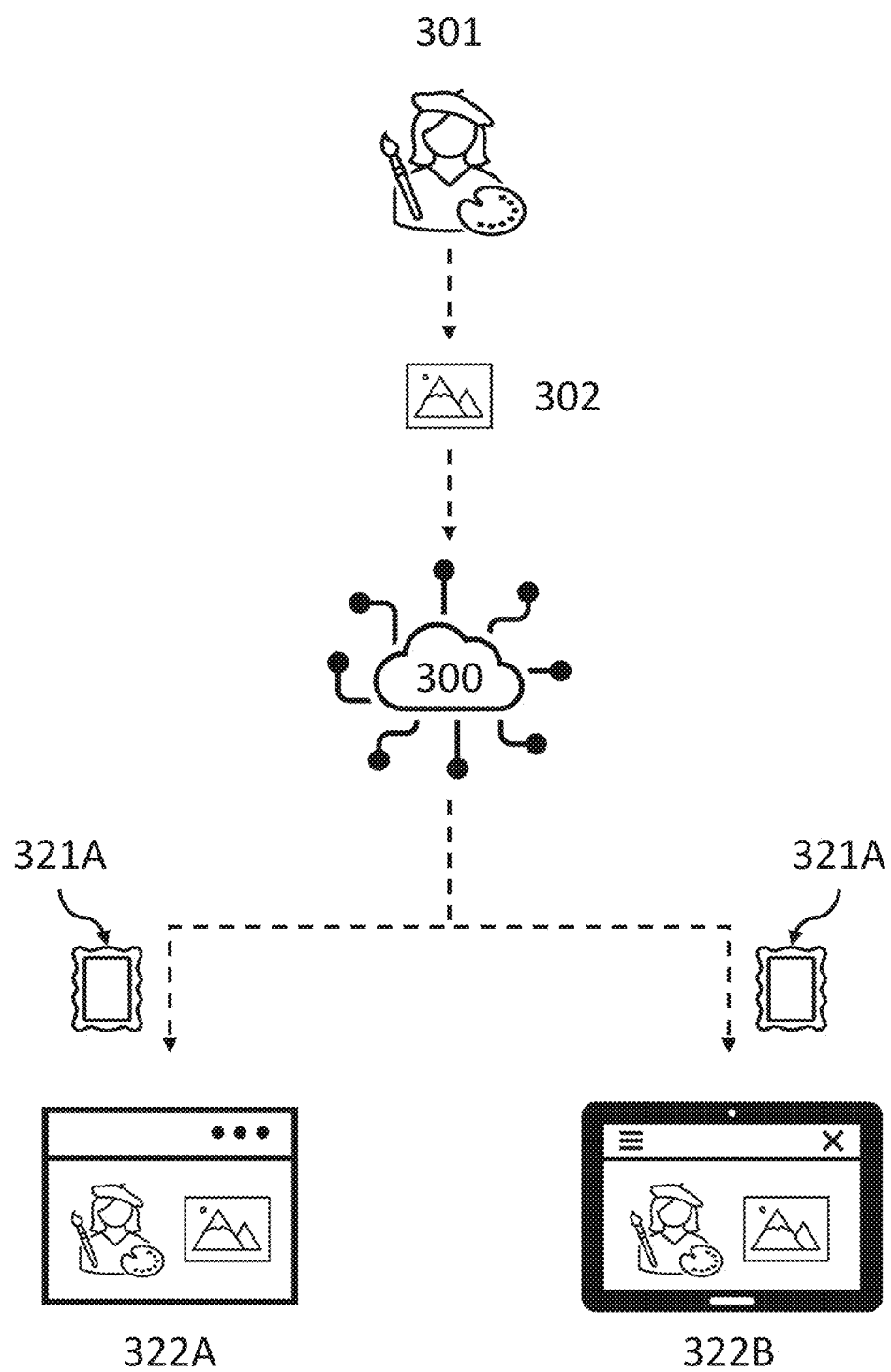
FIGS. 3A and 3B depict processes for generating a digital media frame and integrating a digital media frame into one or more web galleries.

FIG. 3A depicts a process for generating a digital media frame and integrating the digital media frame into one or more web galleries. In some embodiments, an individual digital media frame generated for a digital media asset may be integrated into only one web gallery. In some embodiments, an individual digital media frame generated for a digital media asset may be integrated into a plurality of web galleries. For example, in the example depicted by FIG. 3A, a digital media producer 301 (e.g., a graphical artist) creates a digital media asset 302 (e.g., an image file of a new graphic) and submits the digital media asset 302 to the digital media distribution infrastructure (DMDI) 300. The DMDI 300 generates a digital media frame 321 (e.g., digital media frame 321A) for the digital media asset 302 and provides the digital media frame 321 to the digital media producer 301. In this example, the digital media producer 301 then integrates the digital media frame 321 into two different web galleries 322, web gallery 322A and web gallery 322B. In this example, web galleries 322A and 322B exist on and are accessed (e.g., by digital media consumers) through two different digital territories. A digital territory is a uniquely addressable digital entity, such as a website (e.g., a web domain), a web application, or a mobile application. In the example depicted by FIG. 3A, web gallery 322A is a website (e.g., the digital media producer's website), and web gallery 322B is a mobile application executed on a tablet device.

Figure 3B:
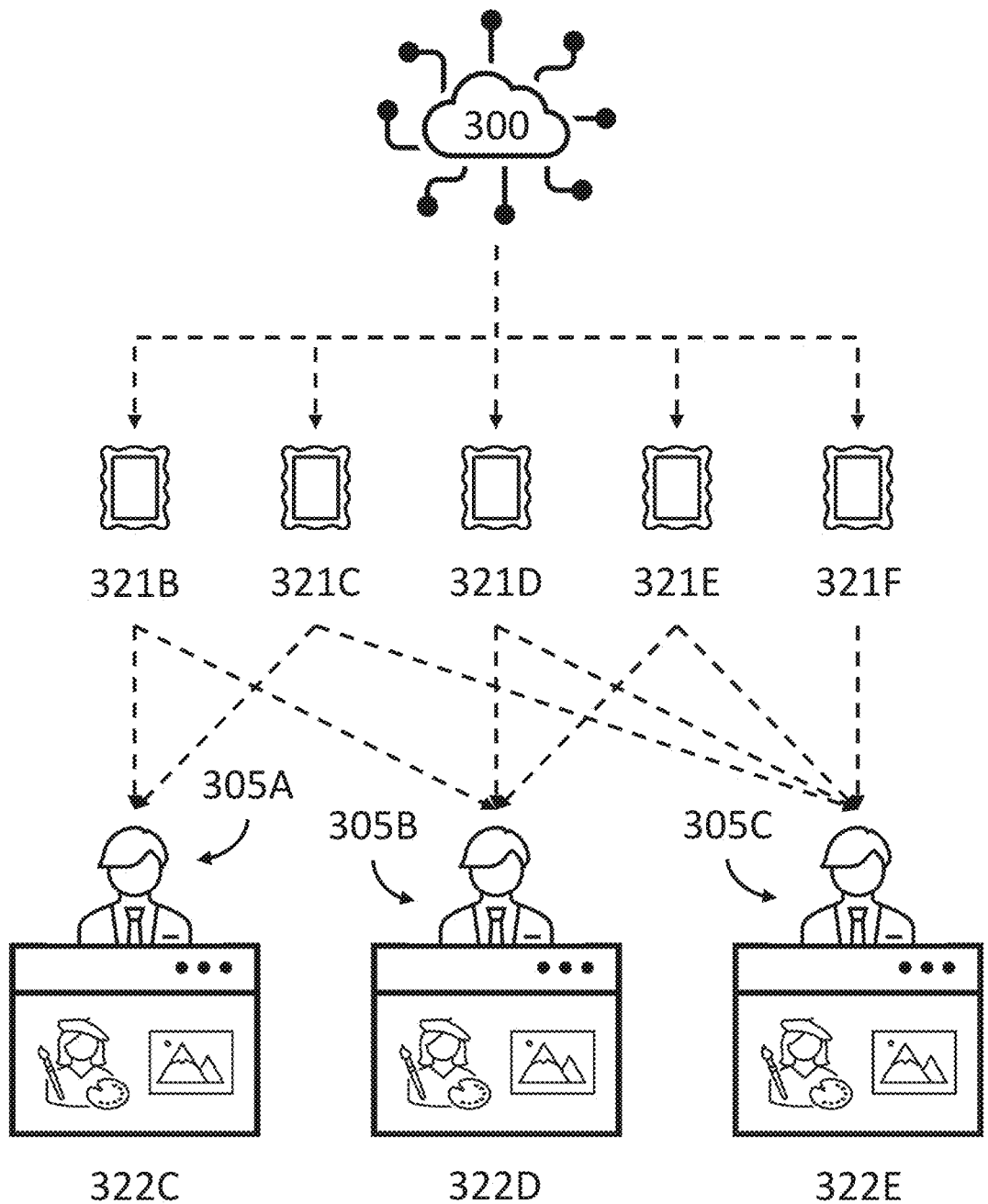

FIG. 3B depicts a process for generating a digital media frame and integrating the digital media frame into one or more web galleries. In some embodiments, a plurality of digital media frames generated for a respective plurality of digital media assets may be integrated into a single web gallery. For example, in the example depicted by FIG. 3B, the DMDI 300 has generated five digital media frames 321 (e.g., digital media frames 321B-321F), and two or more of the five digital media frames 321 have been integrated into each of three web galleries 322 (e.g., web galleries 322C-322E). For example, digital media frames 321B and 321C have been integrated into web gallery 322C, digital media frames 321B, 321D, and 321E have been integrated into web gallery 322D, and digital media frames 321C-321F have been integrated into web gallery 322E. In some embodiments, a digital media frame 321 generated for a digital media asset by the DMDI 300 is only provided to the digital media producer that submitted the digital media asset to the DMDI 300, so that the digital media frame 321 may only be integrated into web galleries 322 of the digital media producer's choice. However, in some embodiments, a digital media frame 321 generated for a digital media asset by the DMDI 300 is provided to anyone (e.g., any user of the DMDI 300), so that the digital media frame 321 may be integrated into any web gallery 322.

In some embodiments, a user of the DMDI 300 that integrates, into a web gallery 322, a digital media frame 321 generated for a digital media asset that the user did not submit to the DMDI 300 (i.e., the user is not the digital media producer associated with the digital media asset) is referred to as a digital media curator 305. For example, in the example depicted by FIG. 3B, the three web galleries 322C-322E are associated with three respective digital media curators 305A-305C. In this example, digital media curator 305A has integrated digital media frames 321B and 321C into web gallery 322C; digital media curator 305B has integrated digital media frames 321B, 321D, and 321E into web gallery 322D; and digital media curator 305C has integrated digital media frames 321C-321F into web gallery 322E. By allowing a digital media curator 305 to integrate one or more digital media frames 321 into a web gallery 322, the DMDI 300 provides the digital media curator 305 with the ability to create a curated collection of digital media assets, much like a curator of a real world art gallery. In some embodiments, when a digital media curator 305 integrates a digital media frame 321 into a web gallery 322 associated with the digital media curator 305, and a digital media consumer unlocks the digital media frame 321 by selecting the digital media frame within the GUI of the web gallery 322 and allowing the DMDI 300 to deduct, from a media credit account associated with the digital media consumer, an amount of media credits equal to the media credit value established for the digital media asset for which the digital media frame 321 was generated (as described above and below), the DMDI 300 adds a portion of the media credits deducted from the media credit account associated with the digital media consumer to a media credit account associated with the digital media curator 305 (e.g., alternatively or in addition to any portion of the media credits deducted from the media credit account associated with the digital media consumer and added to a media credit account associated with the digital media producer that submitted the digital media asset for which the digital media frame 321 was generated). Thus, in such an embodiment, the DMDI 300 provides digital media curator 305 with an incentive to identify and curate a marketable collection of digital media frames 321. In some embodiments, one or more digital media frames 321 provided to a digital media curator 305 to be integrated into a web gallery 322 associated with the digital media curator 305 are autonomously selected by a curation algorithm. In some embodiments, a curation algorithm uses data or metadata associated with digital media frames 321 to create a marketable collection of digital media frames 321. In some embodiments, a curation algorithm is a machine learning algorithm. In some embodiments, a curation algorithm is provided to a digital media curator 305 by the DMDI 300.

Figure 4:
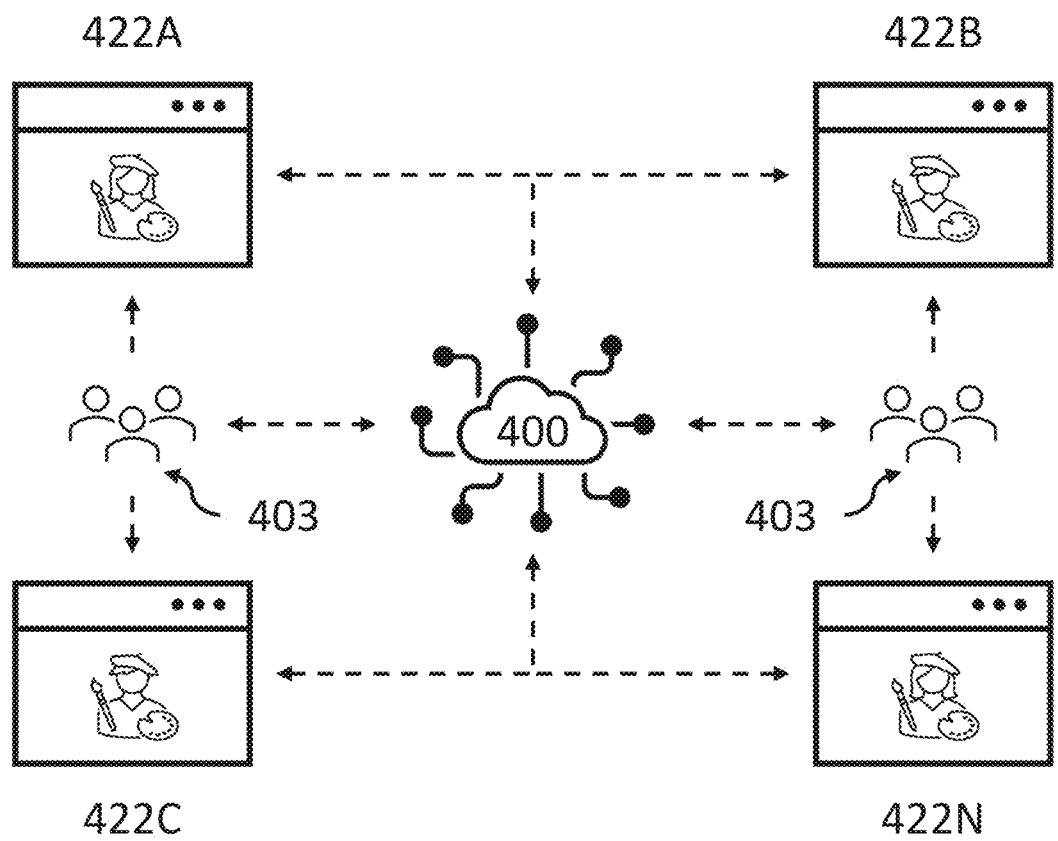
FIG. 4 depicts a diagram of a network of web galleries facilitated by a digital media distribution infrastructure.

FIG. 4 depicts a diagram of a network of web galleries facilitated by a digital media distribution infrastructure. As mentioned above, in some embodiments, through the use of a digital media distribution infrastructure (DMDI) 400, any digital territory (e.g., a website, web application, or mobile application) can be turned into a web gallery, providing the proprietor of the digital territory (e.g., a digital media producer or a digital media curator) with a digital storefront and a digital warehouse for commercializing digital media assets. In some embodiments, as depicted by FIG. 4, the DMDI 400 can support an unlimited number of web galleries 422 (e.g., web galleries 422A-422N), and any digital media consumer 403 can access any web gallery 422. In some embodiments, each web gallery 422 supported by the DMDI 400 may be accessed through a different digital territory, and there is no single digital territory through which all of the digital media assets received by the DMDI 400 may be accessed. As depicted by FIG. 4, the result is a decentralized infrastructure for the distribution of digital media assets, wherein a digital media producer is able to commercialize their art without sacrificing ownership and agency. Similarly, by providing digital media curators with the ability to create and curate and unlimited number of web galleries 422, the DMDI 400 can establish a marketplace for digital media assets that can serve any niche of digital art.

Figure 5A:
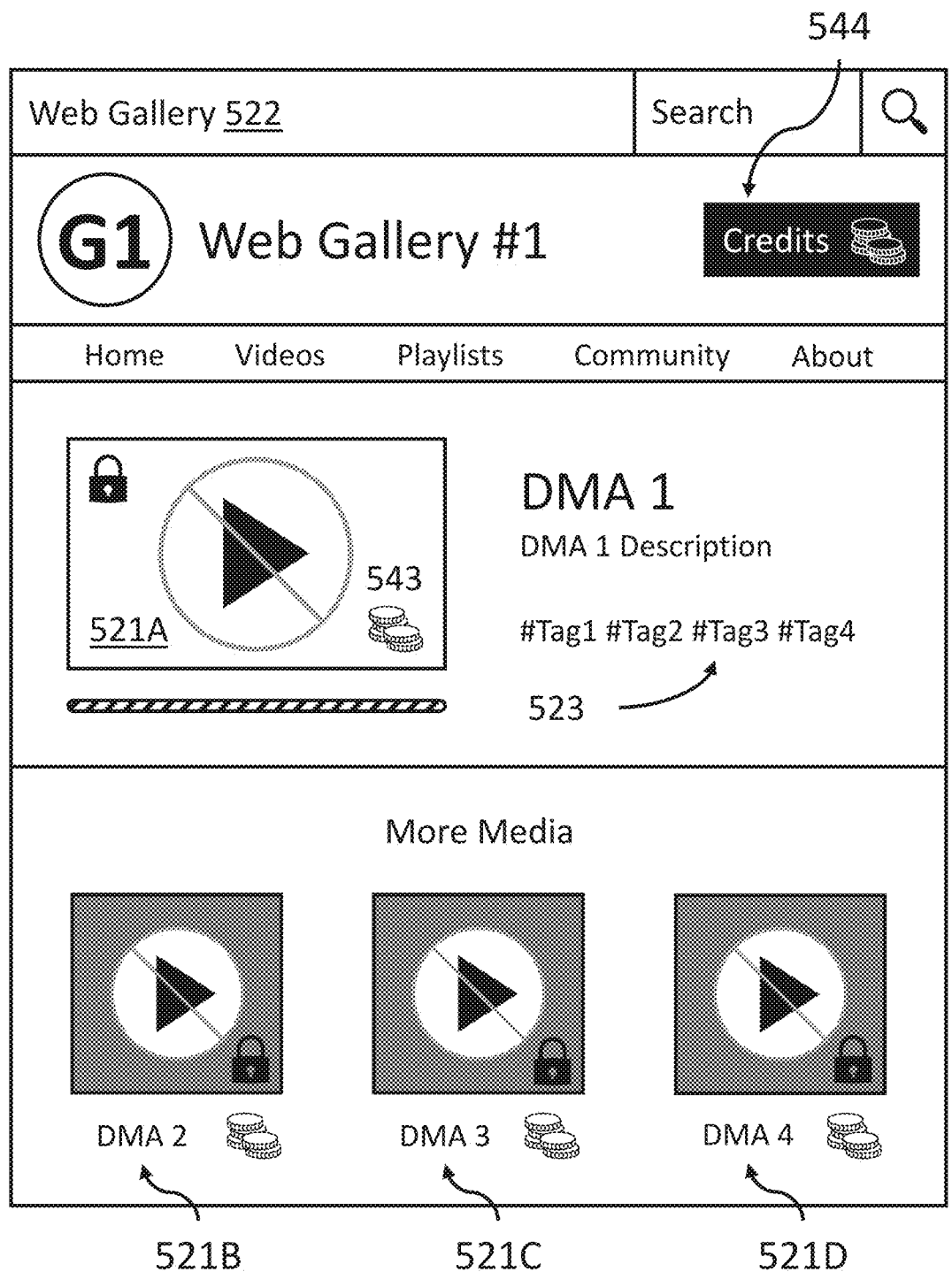
FIGS. 5A and SB illustrate an exemplary embodiment of a web gallery.
Figure 5B:
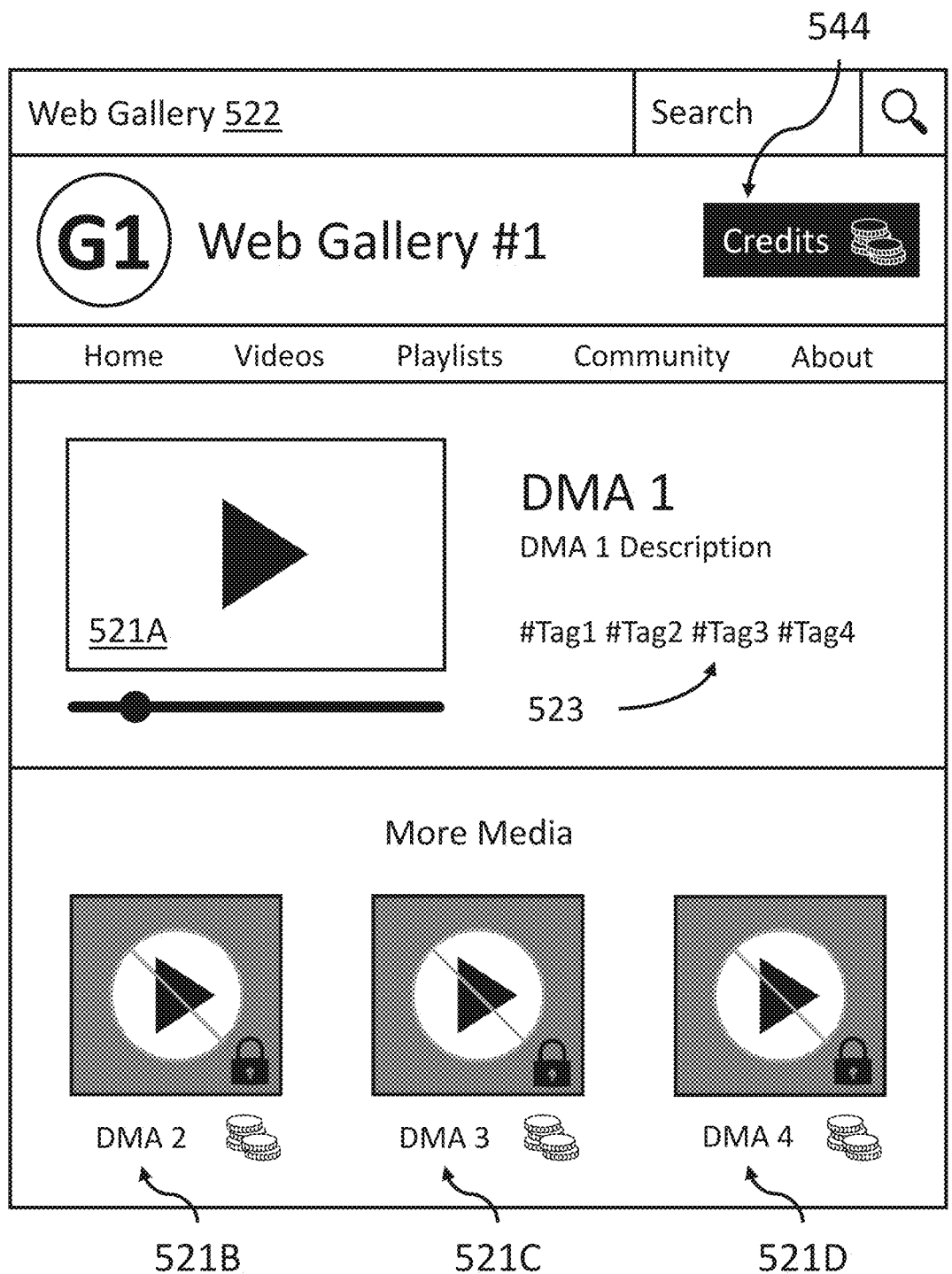

FIGS. 5A and 5B illustrate an exemplary embodiment of a web gallery. As mentioned above, a web gallery is a software system into which a digital media frame has been integrated. In some embodiments, the relationship between a digital media asset, a digital media frame, and a web gallery is analogous to that of a painting, a picture frame, and a real-world art gallery. Similar to the ways in which an artist can create a painting, the painting can be fixed into a picture frame for display, and an art gallery can hang the framed painting on a wall within the art gallery for consumption by patrons, a digital media producer can create a digital media asset, the digital media distribution infrastructure (DMDI) can generate a digital media frame for the digital media asset, and the digital media frame generated for the digital media asset can be displayed within the graphical user interface (GUI) of a web gallery for consumption by digital media consumers. In some embodiments, a web gallery may be any type or form of internet-enabled software system with a GUI within which a digital media frame (e.g., the widget of the digital media frame) can be displayed. For example, in some embodiments, a web gallery may be a website, a web application, a mobile application, or an Internet of Things (IoT) device.

In the example illustrated by FIG. 5A, Web Gallery #1 (i.e., web gallery 522) is a website into which a digital media frame 521 (e.g., digital media frame 521A) has been integrated (e.g., by a digital media curator, as described above). In some embodiments, as illustrated in FIG. 5, a plurality of digital media frames 521 may be integrated into a single web gallery 522. For example, in the example illustrated by FIG. 5, four digital media frames 521 have been integrated into web gallery 522, digital media frames 521A-521D. In this example, the digital media assets for which the four digital media frames 521 that have been integrated into web gallery 522 were generated are all video files. In some embodiments, an individual digital media frame 521 (e.g., the widget of the digital media frame 521) may be displayed within the GUI of a web gallery 522 in different forms or modes. For example, in some embodiments, an individual digital media frame 521 may have an expanded form and a collapsed form. In some embodiments, an expanded form of a digital media frame 521 displays or provides access to more functions of the digital media frame 521 than a collapsed form of the digital media frame 521. For example, in some embodiments, the expanded form of a digital media frame 521 displays a preview (as described above) of the digital media asset for which the digital media frame 521 was generated, while the collapsed form of the digital media frame 521 does not display a preview of the digital media asset. In some embodiments, an expanded form of a digital media frame 521 displays more information regarding the digital media asset for which the digital media frame 521 was generated than a collapsed form of the digital media frame 521. For example, as illustrated in FIG. 5A, digital media frame 521A (e.g., the widget of digital media frame 521A) is displayed within the GUI of web gallery 522 in an expanded form, while digital media frames 521B-521D (e.g., the widgets of digital media frames 521B-521D) are displayed within the GUI of the web gallery 522 in a collapsed form. In this example, the expanded form of digital media frame 521A displays the title of the digital media asset for which digital media frame 521A was generated, "DMA 1," a written description of DMA 1, four tags 523 associated with DMA 1, and the media credit value 543 established for DMA 1; while the collapsed forms of digital media frames 521B-521D display only the titles of, and the media credit values established for, the digital media assets for which digital media frames 521B-521D were generated.

In the example illustrated by FIG. 5A, all of the digital media frames 521 (e.g., the widgets of the digital media frames 521) integrated into web gallery 522 are displayed within the GUI of web gallery 522 in a locked state (as described above), as represented by the lock icon. For example, as illustrated in FIG. 5A, while digital media frame 521A is in a locked state, the video file for which digital media frame 521A was generated cannot be played through digital media frame 521A (e.g., the widget of frame 521A). As such, the digital media assets for which digital media frames 521A-521D were generated cannot be accessed by a digital media consumer through digital media frames 521A-521D until the digital media consumer selects one of the digital media frames 521 and the DMDI successfully deducts an amount of media credits equal to the media credit value 543 established for the digital media asset for which the digital media frame 521 was generated from a media credit account associated with the digital media consumer. As mentioned above, in response to detecting the selection of the digital media frame 521 and successfully deducting the media credit value 543 from the media credit account associated with the digital media consumer, the DMDI would then provide the digital media consumer with access to the digital media asset for which the digital media frame 521 was generated by unlocking the digital media frame 521. For example, in the example illustrated by FIG. 5B, a digital media consumer has selected digital media frame 521A, and the DMDI has successfully deducted the media credit value 543 established for the digital media asset for which digital media frame 521A was generated from a media credit account associated with the digital media consumer. In response, digital media frame 521A has now been unlocked. In this example, as illustrated in FIG. 5B, now that digital media frame 521A has been unlocked, the digital media consumer can access all of the features and functions of digital media frame 521A. In this example, the digital media consumer can now stream the video file for which digital media frame 521A was generated by selecting the play button within the widget of digital media frame 521A. However, as illustrated in FIG. 5B, because the digital media consumer has not yet selected any of digital media frames 521B-521D, and because the DMDI has not yet successfully deducted the media credit value 543 established for the digital media assets for which digital media frames 521B-521D were generated from the media credit account associated with the digital media consumer, digital media frames 521B-521D remained locked.

In some embodiments, as illustrated in FIGS. 5A and 5B, if there are not enough media credits in a media credit account associated with a digital media consumer to unlock a digital media frame 521 (e.g., the digital media frame 521 was generated for a digital media asset for which a media credit value 543 was established that is greater than the amount of media credits in the media credit account associated with the digital media consumer), or if the digital media consumer otherwise wishes to add media credits to the media credit account associated with the digital media consumer, the digital media consumer can access a media credit portal (as described below) by selecting a media credits button 544 (e.g., a link to the media credit portal) displayed within the GUI of a web gallery. In some embodiments, a digital media consumer can access a media credit portal by selecting a digital media frame 521. For example, in some embodiments, if a digital media consumer selects a digital media frame 521, and the DMDI is unable to successfully deduct an amount of media credits equal to the media credit value 543 established for a digital media asset for which the digital media frame 521 was generated (e.g., the media credit value established for the digital media asset is greater than the amount of media credits in the media credit account associated with the digital media consumer, or if there is not yet a media credit account associated with the digital media consumer), the digital media consumer will be automatically directed to a media credit portal.

Media Credit Accounts and Media Credit Portals

In some embodiments, a media credit account is an account associated with a digital media consumer, a digital media producer, or a digital media curator into or from which media credits provided by a digital media distribution infrastructure (DMDI) can be dynamically added or deducted. In some embodiments, a media credit is a unit of a digital coin or token that can be used to unlock a digital media frame (as described above), or to otherwise engage in services provided by the DMDI. In some embodiments, a media credit is a cryptocurrency (e.g., a crypto coin or a crypto token) facilitated by a blockchain system. In some embodiments, as mentioned above, to access a digital media asset through a digital media frame, a digital media consumer must be associated with a media credit account that includes an amount of media credits equal to or greater than a media credit value established for the digital media asset. In some embodiments, a digital media consumer can create or manage a media credit account by accessing a media credit portal provided by the DMDI. For example, in some embodiments, to create a profile with the DMDI, a digital media consumer registers with the DMDI, such as by accessing a website, web application, or mobile application (e.g., a media portal or a media credit portal, as described below) provided by the DMDI and completing a sign up process. In some embodiments, once the digital media consumer has created a profile with the DMDI, the DMDI creates a media credit account associated with the digital media consumer. Likewise, in some embodiments, to create a profile with the DMDI, a digital media producer registers with the DMDI, such as by accessing a website, web application, or mobile application provided by the DMDI and completing a sign up process. In some embodiments, once the digital media producer has created a profile with the DMDI, the DMDI creates a media credit account associated with the digital media producer. Similarly, in some embodiments, to create a profile with the DMDI, a digital media curator registers with the DMDI, such as by accessing a website, web application, or mobile application provided by the DMDI and completing a sign up process. In some embodiments, once the digital media curator has created a profile with the DMDI, the DMDI creates a media credit account associated with the digital media curator. In some embodiments, a user of the DMDI may be two or more of a digital media consumer, a digital media producer, and a digital media curator, and have only a single media credit account associated with the user. In some embodiments, a digital media consumer may use the media credit account associated with the digital media consumer to unlock a plurality of digital media frames integrated into a respective plurality of web galleries, as described above. In such an embodiment, the media credit account associated with the digital media consumer may be considered a "floating" media credit account, because the media credit account is not bound to a single web gallery.

Figure 6:
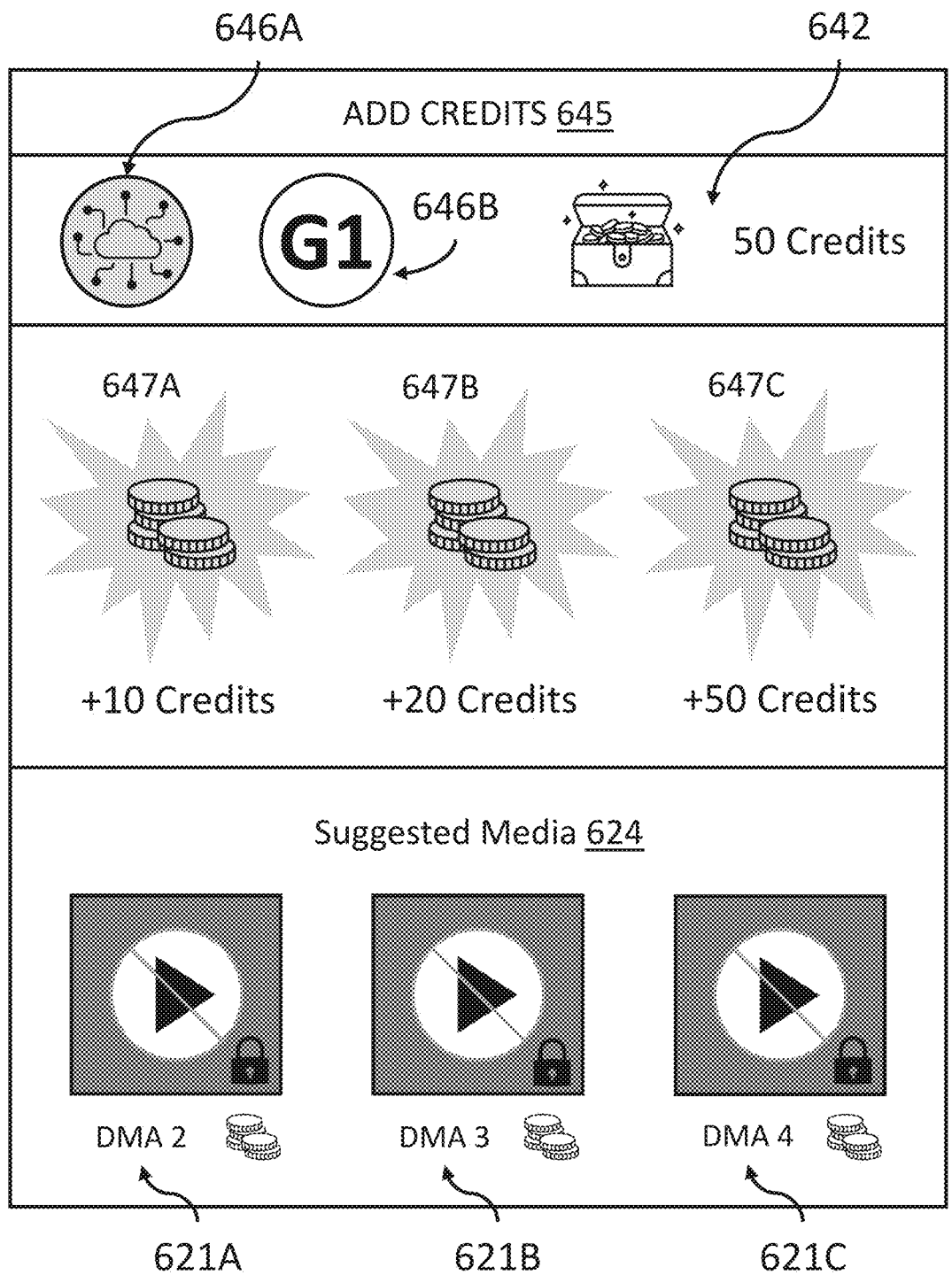
FIG. 6 illustrates an exemplary embodiment of a media credit portal.

FIG. 6 illustrates an exemplary embodiment of a media credit portal. In some embodiments, as illustrated by FIG. 6, a media credit portal 645 is a website or a web application that includes a graphical user interface (GUI). In some embodiments, as illustrated in FIG. 6, the GUI of the media credit portal 645 includes a media credit account 642, media credit acquisition options 647, and a suggested media section 624. In some embodiments, as illustrated in FIG. 6, the media credit portal 645 includes a DMDI brand image 646A or a web gallery brand image 646B, as described below. In the example illustrated by FIG. 6, a user of the DMDI (e.g., a digital media consumer) who has accessed the media credit portal 645 is associated with a media credit account 642 that contains 50 media credits. In this example, the media credit portal 645 displays three media credit acquisition options 647A-647C. In some embodiments, to add media credits to a media credit account 642 associated with a user of the DMDI, the user selects a media credit acquisition option 647, and the DMDI adds an amount of media credits equal to that of the media credit option 647 to the media credit account 642 associated with the user. For example, if the user associated with the media credit account 642 illustrated in FIG. 6 selects media credit acquisition option 647A, the DMDI will add 10 media credits to the media credit account 642 associated with the user, bringing the total amount of media credits in the media credit account 642 associated with the user to 60 credits. In some embodiments, media credits must be purchased from the DMDI in exchange for an appropriate amount of a real world currency (e.g., a fiat currency). For example, in some embodiments, to add media credits to a media credit account 642 associated with a user of the DMDI, the user must select a media credit acquisition option 647 and then exchange (e.g., via a credit or debit transaction) an amount of a real world currency equal to the value of the media credit acquisition option 647, as determined by the DMDI. In some embodiments, media credits provided by the DMDI are pegged to the value of a fiat currency. For example, the DMDI may determine that a single media credit is worth one US dollar (USD), such that the value of media credit acquisition option 647A, which is for 10 media credits, would be 10 USD. Or, for example, the DMDI may apply a scaling discount to larger media credit acquisition options. For example, the DMDI may determine that the value of media credit acquisition option 647A (e.g., for 10 media credits) is 10 USD (i.e., 1.0 USD per media credit), the value of media credit acquisition option 647B (e.g., for 20 media credits) is 18 USD (i.e., 0.9 USD per media credit), and the value of media credit acquisition option 647C (e.g., for 50 media credits) is 40 USD (i.e., 0.8 USD per media credit). However, the DMDI may determine the value of a media credit acquisition option 647 in any other way.

In some embodiments, a digital media consumer can access a media credit portal 645 directly, such as by navigating to a website on which the media credit portal 645 is hosted or by opening the media credit portal 645 within a mobile application. In some embodiments, as mentioned above, a digital media consumer can be directed to a media credit portal 645 from a web gallery. For example, in some embodiments, if a digital media consumer accesses a web gallery website and selects, from within the GUI of the web gallery website, a digital media frame generated for a digital media asset for which the established media credit value is greater than the amount of media credits contained within the media credit account associated with the digital media consumer, the digital media frame will function as a weblink to a media credit portal 645 website, through which the digital media consumer can acquire any necessary or desired media credits. However, a digital media consumer can be directed to a media credit portal 645 in any other way. For example, in the example illustrated by FIG. 6, a digital media consumer has been directed to the media credit portal 645 from web gallery #1 (as illustrated in FIGS. 5A and 5B). In some embodiments, as illustrated in FIG. 6, when a digital media consumer is directed to a media credit portal 645 from a web gallery, the media credit portal 645 displays a brand image 646B associated with the web gallery within the GUI of the media credit portal 645. In some embodiments, as illustrated in FIG. 6, a media credit portal 645 includes a suggested media section 624, wherein the media credit portal 645 displays one or more digital media frames 621 (e.g., digital media frames 621A-621C) generated for digital media assets that the DMDI has suggested for the digital media consumer that has accessed the media credit portal 645. In some embodiments, the DMDI suggests digital media assets for a digital media consumer based on the history of digital media assets previously accessed by the digital media consumer through digital media frames generated by the DMDI. In some embodiments, the DMDI suggests digital media assets for a digital media consumer based on one or more digital media frames integrated into a web gallery from which the digital media consumer was directed to the media credit portal 645. In some embodiments, the DMDI suggests digital media assets for a digital media consumer based on a digital media frame selected by the digital media consumer that directed the digital media consumer to the media credit portal 645. However, the DMDI may suggest digital media assets for a digital media consumer in any other way.

Digital Media Portal

Figure 7A:
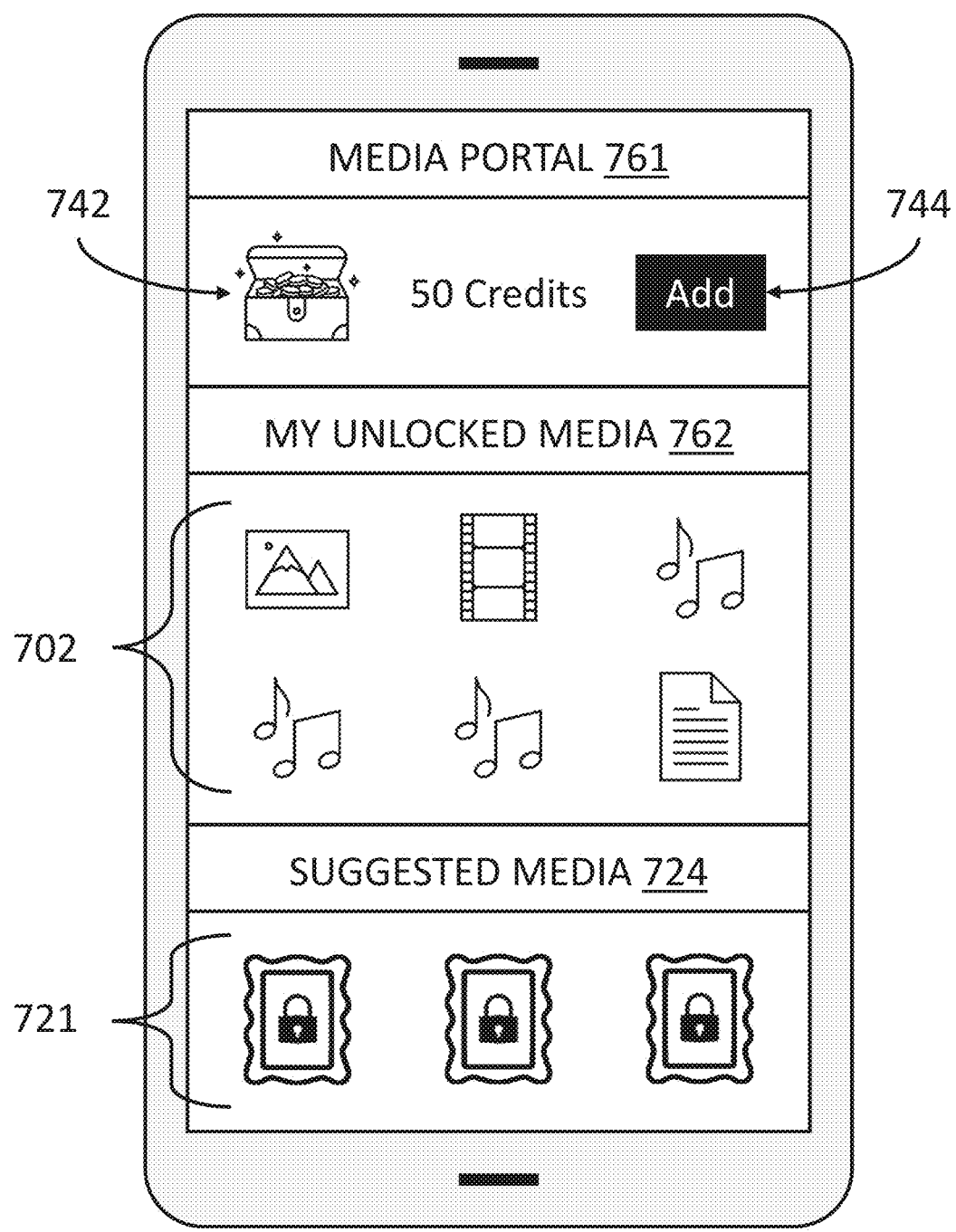
FIGS. 7A and 7B illustrate an exemplary embodiment of a digital media portal.
Figure 7B:
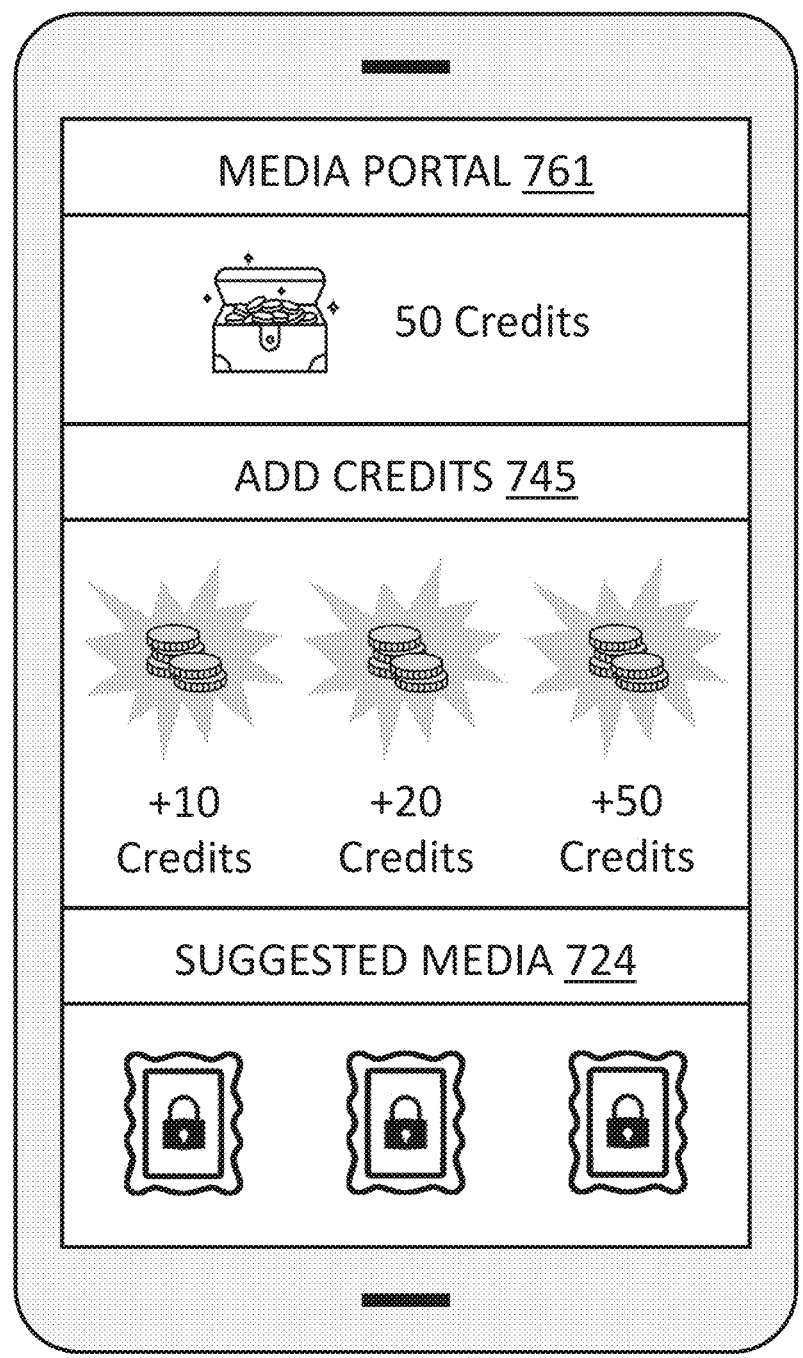

In some embodiments, the digital media distribution infrastructure (DMDI) provides a digital media portal through which a digital media consumer can manage their profile created with the DMDI (e.g., by employing the media portal module 160, as depicted in FIG. 1). FIGS. 7A and 7B illustrate an exemplary embodiment of a digital media portal provided by the DMDI. In some embodiments, a digital media portal 761 is a website, a web application, or a mobile application. In some embodiments, as illustrated in FIG. 7A, a digital media portal 761 includes an unlocked media section 762 wherein the digital media portal 761 displays a list of the digital media assets 702 that the digital media consumer that has accessed the digital media portal 761 has accessed through digital media frames generated by the DMDI. In some embodiments, a digital media consumer can access a digital media asset 702 that the digital media consumer has previously accessed through a digital media frame generated by the DMDI by selecting the digital media asset 702 from within the list of digital media assets displayed within the unlocked media section 762 of the digital media portal 761. In some embodiments, as illustrated in FIG. 7A, a digital media portal 761 includes a suggested media section 724 wherein the digital media portal 761 displays one or more digital media frames 721 generated for digital media assets that the DMDI has suggested for the digital media consumer that has accessed the digital media portal 761, as described above. In some embodiments, as illustrated in FIG. 7A, a digital media portal 761 displays the media credit account 742 associated with the digital media consumer that has accessed the digital media portal 761 and a link 744 to a media credit portal (as described above). In some embodiments, if a digital media consumer selects the link 744 to a media credit portal from within the GUI of the digital media portal 761, the digital media portal 761 will display a media credit portal 745 within the GUI of the digital media portal 761, as illustrated in FIG. 7B.

Digital Media Distribution Infrastructure in the Metaverse

As described above, in various embodiments, a digital media distribution infrastructure (DMDI) provides digital media producers with a digital warehouse and a digital storefront for commercially distributing their digital media assets. As described above, in various embodiments, the DMDI is capable of receiving a digital media asset from a digital media producer and generating a digital media frame for the digital media asset. As described above, in various embodiments, a digital media frame generated by the DMDI can be integrated into any uniquely addressable digital territory (e.g., a website or a mobile application) to create a web gallery, and the digital media asset for which the digital media frame was generated can be accessed on or through the web gallery via the digital media frame (e.g., in exchange for one or more media credits, as described above).

Similarly, in some embodiments, a digital media frame generated for a digital media asset by the DMDI may be integrated into any uniquely addressable artificial or virtual environment within a metaverse. A metaverse is a collection of artificial or virtual environments. Different metaverses may take on different embodiments. For example, in some embodiments of a metaverse, the collection of artificial or virtual environments included in the metaverse make up one continuous virtual world (e.g., a collection of digital properties that make up a replica of a real world city) that is provided by a single digital entity. Or for example, in some embodiments of a metaverse, the artificial or virtual environments included in the metaverse are provided by different digital entities and make up a discontinuous virtual world.

Figure 8:
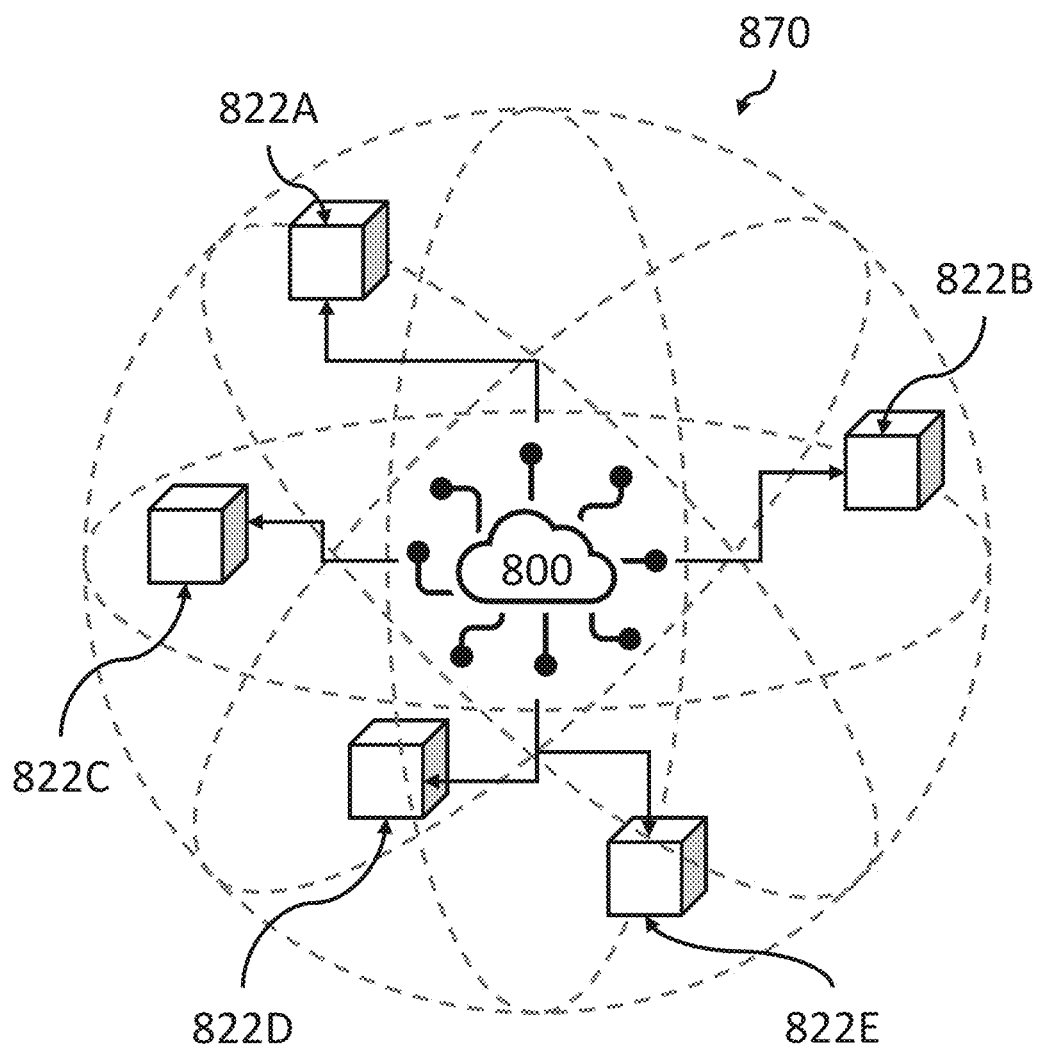
FIG. 8 depicts a diagram of a network of meta galleries facilitated by a digital media distribution infrastructure.

FIG. 8 depicts an exemplary embodiment of a digital media distribution infrastructure (DMDI) implemented within a metaverse. An artificial or virtual environment into which a digital media frame generated by the DMDI has been integrated is referred to hereinafter as a "meta gallery" 822. For example, in the example depicted by FIG. 8, digital media frames generated by the DMDI 800 have been integrated into five different artificial or virtual environments included in the metaverse 870, creating five respective meta galleries 822A-822E. In some embodiments, similar to a digital media frame integrated into a web gallery (as described above), a digital media frame integrated into a meta gallery 822 includes or is otherwise paired with an artificial or virtual user interface element that is presented within the artificial or virtual environment of the meta gallery 822. In some embodiments, similar to a digital media frame integrated into a web gallery, a digital media frame integrated a meta gallery 822 (e.g., the artificial or virtual user interface element associated with the digital media frame) is initially presented within the meta gallery 822 in a locked state, wherein the digital media asset for which the digital media frame was generated cannot be accessed within the artificial or virtual environment of the meta gallery 822 until the digital media frame is unlocked (e.g., in exchange for one or more media credits, as described above).

For example, in one embodiment, a virtual environment provided by a digital entity within a metaverse 870 is a virtual apparel store that designs virtual clothes for virtual avatars. In this example, to commercialize their virtual clothing designs, the proprietor (e.g., a digital media producer) of the virtual apparel store employs the DMDI 800 by providing their virtual clothing designs (e.g., digital media assets) to the DMDI 800 and establishing media credit values for the virtual clothing designs. The DMDI 800 then generates, for the virtual clothing designs, digital media frames that can be integrated into the virtual apparel store to create a meta gallery 822. In this example, if a visitor to the virtual apparel store selects a digital media frame that has been generated for one of the virtual clothing designs (e.g., a pair of virtual sneakers) and integrated the virtual apparel store, the DMDI 800 will attempt to deduct the media credit value established for the virtual clothing design from a media credit account (as described above) associated with the visitor (e.g., a digital media consumer). If the DMDI 800 is able to successfully deduct the media credit value established for the virtual clothing design from a media credit account associated with the visitor, the DMDI 800 will provide the virtual clothing design to the visitor to be applied to a virtual avatar associated with the visitor.

As a person skilled in the art will recognize from the previous detailed description and from the figures and claims, modifications and changes can be made to the embodiments of the invention without departing from the scope of this invention as disclosed here in the present application. It will be appreciated that, although the methods, processes, and functions of the present application have been recited in a particular series of steps, the individual steps of the methods, processes, and functions may be performed in any order, in any combination, or individually.

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

The aforementioned computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks. The computer program instructions may also be loaded onto a computer or other programmable data processing apparatus to cause a series of operational steps to be performed on the computer or other programmable apparatus, to produce a computer implemented process such that, the instructions which execute on the computer or other programmable apparatus provide steps for implementing the functions/acts specified in the block or blocks.

In general, the word "module" as used herein, refers to logic embodied in hardware or firmware, or to a collection of software instructions, written in a programming language, such as, Java, C, etc. One or more software instructions in the unit may be embedded in firmware. The modules described herein may be implemented as either software and/or hardware modules and may be stored in any type of non-transitory computer-readable medium or other non-transitory storage elements. Some non-limiting examples of non-transitory computer-readable media include CDs, DVDs, BLU-RAY, flash memory, and hard disk drives.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

What is claimed is:

1. A method for facilitating a distribution infrastructure for digital media assets, the method comprising:
   generating a digital media frame for a digital media asset;
   providing, to a digital media curator, the digital media frame generated for the digital media asset, wherein the digital media frame is configured to be integrated into a web gallery associated with the digital media curator and comprises a compilation of programming commands that, when executed, prompt the web gallery to display a graphical user interface (GUI) element through which the digital media asset may be accessed;
   detecting a selection, made by a digital media consumer through a GUI of the web gallery, of the digital media frame, wherein the digital media frame is initially presented within the GUI of the web gallery in a locked state, in which the digital media asset cannot be accessed through the digital media frame;
   deducting an amount of media credits equal to a media credit value established for the digital media asset from a first media credit account associated with the digital media consumer;
   in response to detecting the selection of the digital media frame and successfully deducting the amount of media credits equal to the media credit value established for the digital media asset from the first media credit account associated with the digital media consumer, unlocking the digital media frame, such that the digital media frame is presented within the GUI of the web gallery in an unlocked state, in which the digital media asset can be accessed through the digital media frame;
   after the digital media frame is integrated into the web gallery associated with the digital media curator, transmitting the digital media asset to the web gallery from a digital media database in which the digital media asset is stored, such that the digital media consumer may access the digital media asset through the digital media frame presented in the unlocked state; and
   adding a first portion of the amount of media credits deducted from the first media credit account associated with the digital media consumer to a second media credit account associated with the digital media curator.

2. The method of claim 1, wherein the digital media asset is associated with a digital media producer and wherein the digital media curator is not the digital media producer.

3. The method of claim 1, wherein the digital media asset is associated with a digital media producer and further comprising adding a second portion of the amount of media credits deducted from the media credit account associated with the digital media consumer to a third media credit account associated with the digital media producer.

4. The method of claim 1, wherein the digital media asset is associated with a digital media producer and wherein the media credit value established for the digital media asset is determined by the digital media producer.

5. The method of claim 1, wherein the web gallery is a website, a web application, or a mobile application.

6. The method of claim 1, wherein the digital media asset is an audio file or a video file.

7. The method of claim 6, wherein the media credit value established for the digital media asset is based at least in part on the length of the audio or video file.

8. The method of claim 6, wherein unlocking the digital media frame further comprises transmitting the audio or video file to an electronic device on which the web gallery is accessed by the digital media consumer for download.

9. The method of claim 6, wherein unlocking the digital media frame further comprises streaming the audio or video file through the GUI of the web gallery.

10. The method of claim 1, further comprising:
   providing, to a second digital media curator, the digital media frame generated for the digital media asset to be integrated into a second web gallery associated with the second digital media curator;
   detecting a second selection, made by a second digital media consumer through a GUI of the second web gallery, of the digital media frame, wherein the digital media frame is initially presented within the GUI of the second web gallery in the locked state, in which the digital media asset cannot be accessed through the digital media frame;
   deducting the amount of media credits equal to the media credit value established for the digital media asset from a third media credit account associated with the second digital media consumer;
   in response to detecting the second selection of the digital media frame and successfully deducting the amount of media credits equal to the media credit value established for the digital media asset from the third media credit account associated with the second digital media consumer, unlocking the digital media frame, such that the digital media frame is presented within the GUI of the second web gallery in the unlocked state, in which the digital media asset can be accessed through the digital media frame;
   after the digital media frame is integrated into the second web gallery associated with the second digital media curator, transmitting the digital media asset to the second web gallery from the digital media database in which the digital media asset is stored, such that the second digital media consumer may access the digital media asset through the digital media frame presented in the unlocked state; and
   adding a second portion of the amount of media credits deducted from the third media credit account associated with the second digital media consumer to a fourth media credit account associated with the second digital media curator.

11. The method of claim 1, further comprising:
   generating a second digital media frame for a second digital media asset;
   providing, to a second digital media curator, the second digital media frame generated for the second digital media asset to be integrated into a second web gallery associated with the second digital media curator;
   detecting a second selection, made by the digital media consumer through a GUI of the second web gallery, of the second digital media frame, wherein the second digital media frame is initially presented within the GUI of the second web gallery in the locked state, in which the digital media asset cannot be accessed through the digital media frame;
   deducting a second amount of media credits equal to a second media credit value established for the second digital media asset from the first media credit account associated with the digital media consumer;
   in response to detecting the second selection of the second digital media frame and successfully deducting the second amount of credits equal to the second media credit value established for the second digital media asset from the first media credit account associated with the digital media consumer, unlocking the second digital media frame, such that the second digital media frame is presented within the GUI of the second web gallery in the unlocked state, in which the second digital media asset can be accessed through the digital media frame;

after the second digital media frame is integrated into the second web gallery associated with the second digital media curator, transmitting the second digital media asset to the second web gallery from the digital media database, in which the second digital media asset is stored, such that the digital media consumer may access the second digital media asset through the second digital media frame presented in the unlocked state; and adding a second portion of the second amount of media credits deducted from the first media credit account associated with the digital media consumer to a third media credit account associated with the second digital media curator.

12. The method of claim 11, further comprising providing a digital media portal to the digital media consumer, wherein the digital media portal displays a list of digital media assets accessed by the digital media consumer and wherein the list of digital media assets accessed by the digital media consumer comprises the first and second digital media assets.

13. The method of claim 12, wherein the digital media portal displays digital media frames suggested for the digital media consumer.

14. The method of claim 12, wherein the digital media portal displays the number of media credits in the media credit account associated with the digital media consumer.

15. The method of claim 12, wherein the first and second digital media assets are accessible to the digital media consumer through the digital media portal.

16. A distribution system for digital media assets, the system comprising at least one processor, a memory, and instructions executable by the at least one processor to cause the at least one processor to:

generate a digital media frame for a digital media asset;

provide, to a digital media curator, the digital media frame generated for the digital media asset, wherein the digital media frame is configured to be integrated into a web gallery associated with the digital media curator and comprises a compilation of programming commands that, when executed, prompt the web gallery to display a graphical user interface (GUI) element through which the digital media asset may be accessed;

detect a selection, made by a digital media consumer through a GUI of the web gallery, of the digital media frame, wherein the digital media frame is initially presented the GUI of the web gallery in a locked state, in which the digital media asset cannot be accessed through the digital media frame;

deduct an amount of media credits equal to a media credit value established for the digital media asset from a first media credit account associated with the digital media consumer;

in response to detecting the selection of the digital media frame and successfully deducting the amount of media credits equal to the media credit value established for the digital media asset from the first media credit account associated with the digital media consumer, unlock the digital media frame, such that the digital media frame is presented within the GUI of the web gallery in an unlocked state, in which the digital media asset can be accessed through the digital media frame;

after the digital media frame is integrated into the web gallery associated with the digital media curator, transmit the digital media asset to the web gallery from a digital media database in which the digital media asset is stored, such that the digital media consumer may access the digital media asset through the digital media frame presented in the unlocked state; and add a first portion of the amount of media credits deducted from the first media credit account associated with the digital media consumer to a second media credit account associated with the digital media curator.

17. A method for facilitating a distribution infrastructure for digital media assets, the method comprising:

generating a digital media frame for a digital media asset, wherein the digital media frame is configured to be integrated into a web gallery and comprises a compilation of programming commands that, when executed, prompt the web gallery to display a graphical user interface (GUI) element through which the digital media asset may be accessed;

detecting a selection, made by a digital media consumer through a GUI of the web gallery, of the digital media frame, wherein the digital media frame is initially presented within the GUI of the web gallery in a locked state, in which the digital media asset cannot be accessed through the digital media frame;

deducting an amount of media credits equal to a media credit value established for the digital media asset from a first media credit account associated with the digital media consumer;

in response to detecting the selection of the digital media frame and successfully deducting the amount of media credits equal to the media credit value established for the digital media asset from the first media credit account associated with the digital media consumer, unlocking the digital media frame, such that the digital media frame is presented within the GUI of the web gallery in an unlocked state, in which the digital media asset can be accessed through the digital media frame; and after the digital media frame is integrated into the web gallery associated with the digital media curator, transmitting the digital media asset to the web gallery from a digital media database in which the digital media asset is stored, such that the digital media consumer may access the digital media asset through the digital media frame presented in the unlocked state.

18. The method of claim 17, wherein the digital media asset is associated with a digital media producer and a digital media consumer and further comprising:

adding a first portion of the amount of media credits deducted from the media credit account associated with the digital media consumer to a second media credit account associated with the digital media producer; and adding a second portion of the amount of media credits deducted from the media credit account associated with the digital media consumer to a third media credit account associated with the digital media curator.

19. The method of claim 18, wherein the digital media producer is not the digital media curator.

20. The method of claim 17, wherein the web gallery is a website, a web application, or a mobile application and wherein the digital media asset is a text file, an image file, an audio file, or a video file.

* * * * *